United States Patent
Yamasaki et al.

(10) Patent No.: US 6,228,267 B1
(45) Date of Patent: May 8, 2001

(54) WASTE WATER TREATMENT METHOD AND EQUIPMENT BEING ABLE TO ECONOMICALLY TREAT BOTH A WASTE WATER AND AN EXHAUST GAS RESPECTIVELY CONTAINING FLUORINE AND ORGANIC MATTER

(75) Inventors: Kazuyuki Yamasaki, Hiroshima; Noriyuki Tanaka, Fukuyama; Tsuyoshi Takahashi, Asakuchi-gun; Teruhiko Fujimoto, Fukuyama; Shigeki Matsumoto, Fukuyama; Takashi Ogimoto, Fukuyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/275,260

(22) Filed: Mar. 23, 1999

(30) Foreign Application Priority Data

Mar. 24, 1998 (JP) .................................................. 10-075399

(51) Int. Cl.$^7$ .................................. C02F 3/30; C02F 1/58
(52) U.S. Cl. .......................... 210/615; 210/620; 210/630; 210/631; 210/712; 210/151; 210/195.3; 210/199; 210/205; 210/915; 423/240; 423/DIG. 17
(58) Field of Search .................................... 210/615, 620, 210/629–631, 151, 195.3, 205, 199, 220, 260, 915, 712; 423/213.2, 213.7, 232, 240, DIG. 17; 96/235, 203; 95/187, 224

(56) References Cited

U.S. PATENT DOCUMENTS

| | | | |
|---|---|---|---|
| 2,780,523 | * | 2/1957 | Gloss . |
| 3,357,788 | * | 12/1967 | Ross . |
| 4,039,307 | * | 8/1977 | Bondor . |
| 4,588,564 | * | 5/1986 | Kohno et al. . |
| 4,632,810 | * | 12/1986 | Shinoda et al. . |
| 5,132,027 | * | 7/1992 | Ukawa et al. . |
| 5,480,537 | * | 1/1996 | Yamasaki et al. . |
| 5,578,214 | * | 11/1996 | Yamasaki et al. . |
| 5,674,459 | * | 10/1997 | Gohara et al. . |
| 5,702,594 | | 12/1997 | Yamasaki . |
| 5,770,166 | * | 6/1998 | Shimizu et al. . |
| 5,779,999 | * | 7/1998 | Laslo . |

FOREIGN PATENT DOCUMENTS 8-57498  3/1996  (JP) .

* cited by examiner

Primary Examiner—David A. Simmons
Assistant Examiner—Fred Prince
(74) Attorney, Agent, or Firm—Nixon & Vanderhye P.C.

(57) ABSTRACT

This waste water treatment equipment introduces granular calcium carbonate mineral 13, a calcium fluoride 14 in a floc form and a microorganism 15, which are flowing in a lower section 8, into an upper section 7 and sprinkles the same. Therefore, in the upper section 7, the granular calcium carbonate mineral 13 chemically treats fluorine in an exhaust gas, while the calcium fluoride 14 in the floc form chemically treats acid components in the exhaust gas although the effect is little. At the same time, the microorganism 15 biologically treats the organic matter in the exhaust gas. Then, the granular calcium carbonate mineral 13, the calcium fluoride 14 and the microorganism 15 that have not been utilized for exhaust gas treatment treat again the waste water in the lower section 8. With this arrangement, the waste water containing organic matter such as fluorine and surfactant and the exhaust gas containing fluorine and organic matter can be concurrently treated, and the initial cost and running cost can be reduced.

31 Claims, 13 Drawing Sheets

WASTE WATER TREATMENT METHOD AND EQUIPMENT BEING ABLE TO ECONOMICALLY TREAT BOTH A WASTE WATER AND AN EXHAUST GAS RESPECTIVELY CONTAINING FLUORINE AND ORGANIC MATTER

BACKGROUND OF THE INVENTION

The present invention relates to waste water treatment equipment and waste water treatment method capable of concurrently treating an exhaust gas containing fluorine and organic matter when treating a waste water that contains fluorine and organic matter or contains fluorine, organic matter and hydrogen peroxide.

Conventionally, the waste water that contains fluorine and organic matter or contains fluorine, organic matter and hydrogen peroxide discharged from various kinds of industrial facilities, semiconductor plants and so on (the water referred to as waste water hereinafter) has generally been treated separately by waste water treatment equipment and exhaust gas treatment equipment.

That is, with regard to the fluorine in the waste. water, slightly-soluble calcium fluoride is generated principally by incorporating a large amount of slaked lime into the waste water and is precipitated for the removal of the fluorine. The organic matter such as a surfactant and an organic solvent in the waste water have been treated after the treatment of fluorine by performing biological treatment with a nutrition put in a treatment water tank different from that of the treatment of fluorine or by means of an activated carbon adsorption in a case where the organic matter concentration is low.

On the other hand, the fluorine in the exhaust gas has been treated by exhaust gas treatment equipment represented by an acid scrubber, while the organic matter such as the organic solvent in the exhaust gas has been treated by exhaust gas treatment equipment (specifically, an activated carbon adsorption filter unit) stowed with activated carbon. As a representative of the organic matter in the exhaust gas, there can be enumerated organic solvent such as acetone and isopropyl alcohol. Then, the organic solvent is generally treated by adsorption with the activated carbon adsorption unit.

Generally in the activated carbon adsorption filter unit, there are provided two or more activated carbon filters, which alternately repeat adsorption and desorption to continuously treat the organic solvent by adsorption. However, the activated carbon adsorption filter unit does not decompose the organic solvent itself, and therefore, the total amount of the organic solvent itself does not vary.

Furthermore, the existing semiconductor plants and liquid crystal plants are frequently subjected to redevelopment by facility renewal, and there is frequently occurring the phenomenon that the originally planned capability of the exhaust gas treatment equipment becomes insufficient. The reason of the insufficiency of the exhaust gas treatment equipment capability is that the greater number of production units than originally planned tend to be installed and the flow rate of the exhaust gas to be treated in using the production units increases with the introduction of a new production unit.

In contrast to this, the prior art exhaust gas treatment equipment is hard to increase its treatment capability by modifying the aforementioned units after being once installed. Therefore, in order to improve the exhaust gas treatment capability, it is required to newly install additional exhaust gas treatment equipment.

However, newly installing the additional exhaust gas treatment equipment is often difficult in terms of plan from the viewpoint of the initial cost and space.

Therefore, the insufficiency of the exhaust gas treatment capability has hindered the smooth renewal of the production facilities in the semiconductor plants and the liquid crystal plants.

On the other hand, in regard to the influence on the waste water treatment equipment, with the current trend toward the removal of Fleon, in particular, cleaning methods by combinations of a variety of surfactants, acetone, alcohol and so on instead of Fleon for cleaning use in the semiconductor plants and liquid crystal plants are expected as important cleaning methods for the total abolition of Fleon, judging from the their good cleaning performances and small damages on components.

However, the implementation of the cleaning method by a combination of ultrapure water and a surfactant or a variety of acids has the problem that calcium fluoride waste extremely increases with respect to, in particular, the fluorine treatment in the above plants and the problem that the remaining surfactant influences the water quality of the treated water.

Furthermore, the surfactant, which sometimes have a sterilizing effect on the microorganisms utilized for waste water treatment, makes it difficult to perform microorganic treatment.

In view of the aforementioned problems of the prior art waste water treatment technique, there is proposed improved treatment equipment and treatment method as shown, in FIG. 13 (refer to the prior art reference of Japanese Patent Laid-Open Publication No. HEI 8-57498) for concurrently treating a waste water containing fluorine and organic matter and an exhaust gas containing fluorine and organic matter.

In FIG. 13, the reference numeral 101 denotes a first reaction equalizing tank. A first lower section 101a of this first reaction equalizing tank 101 is stowed with calcium carbonate mineral 109A stowed in a stowing basket 110A. The first reaction equalizing tank 101 has a blower 117, a pipe 120A extending from this blower 117 and a diffuser pipe 111A provided at the end of this pipe 120A. The diffuser pipe 111A is arranged at the bottom of the first lower section 101a of the first reaction equalizing tank 101 while constituting an aerating means.

The waste water that contains fluorine and organic matter and is discharged from the production process is first introduced into the first reaction equalizing tank 101.

The water level of the waste water inside the first reaction equalizing tank 101 is adjusted so that the calcium carbonate mineral 109A is submerged. The waste water is strongly stirred by the aerating means. Due to this stirring, the fluorine ion in the waste water and calcium ion dissolving from the calcium carbonate mineral 109A react each other with the lapse of time. In this case, acids such as hydrofluoric acid and sulfuric acid are mixed in the waste water, so that the waste water exhibits acidity. Therefore, calcium tends to easily dissolve from the calcium carbonate mineral 109A. Accordingly, crystalline calcium fluoride (crystal seed) is easily generated.

In a first upper section 101b of the first reaction equalizing tank 101 is arranged a first reaction water sprinkling section 103 stowed with the calcium carbonate mineral 109A and a plastic filler 113A.

Then, in a space S1 leading the exhaust gas and being located below the first reaction water sprinkling section 103 is provided a duct 129 that communicates with this space S1 and is projecting sideways. The end of this duct 129 is mounted with a ventilation fan 112, and this ventilation fan 112 allows the exhaust gas containing fluorine and organic matter from the plant to be led into the space S1.

In a lowermost portion of the first reaction water sprinkling section 103 is provided a grid plate 115A. As shown in FIG. 13, this grid plate 115A has its grid extending in the vertical direction, so that the projected area in the vertical direction is made much smaller than the projected area in the lateral direction. Therefore, the exhaust gas from the duct 129 can easily pass through the grid plate 115A and reach the first reaction water sprinkling section 103.

Then, the exhaust gas whose fluorine has been treated while passing through the first reaction water sprinkling section 103 from the lower side to the upper side, i.e., the treated gas is introduced into an exhaust gas introducing space S2 below a second reaction water sprinkling section 104 provided in a second upper section 102b of a second reaction equalizing tank 102 by way of a duct 121 connected to the uppermost portion of the first reaction equalizing tank 101.

The second reaction equalizing tank 102 is stowed with a calcium carbonate mineral 109B and a charcoal 123 as a filler. Then, at the bottom of the second reaction equalizing tank 102 is arranged a diffuser pipe 111B for pneumatically stirring the inside of the tank. A bottom surface 102c of the second reaction equalizing tank 102 is inclined toward a lower end 116b where an air lift pump 116B has an inlet so that the generated calcium fluoride crystal (crystal seed) can be easily introduced into the second reaction water sprinkling section 104 by an air lift pump 116B.

The calcium carbonate mineral 109B and the charcoal 123 stowed in this second reaction equalizing tank 102 are the microorganism fixing carrier for microorganism, and with the lapse of time, a biofilm is formed on the surfaces of the calcium carbonate mineral 109B and the charcoal 123. If an excessive sludge, i.e., an active sludge generated from another biotic treatment site is put into the second reaction equalizing tank 102, then the biofilm can be speedily made to adhere to the microorganism fixing carrier. Then, the organic matter in the waste water is treated by the microorganism of the biofilm generated on the surfaces of the calcium carbonate mineral 109B and the charcoal 123 in the second reaction equalizing tank 102.

As described above, the fluorine in the waste water is treated by being circulated through the first reaction equalizing tank 101 stowed mainly with the calcium carbonate mineral, not with a large amount of slaked lime, reacted with the calcium carbonate mineral 109A to become a crystalline calcium fluoride, made to pass through the second reaction equalizing tank 102, condensed in a condensation tank 105 and precipitated in a sedimentation tank 106. The organic matter such as an organic solvent and a surfactant in the waste water is treated mainly by the microorganism fixed on the calcium carbonate and the charcoal in the second reaction equalizing tank 102.

On the other hand, the exhaust gas treatment section is provided in the upper sections of the first reaction equalizing tank and the second reaction equalizing tank, and the fluorine and organic matter in the exhaust gas are dissolved in the circulating waste water and treated by reaction with the calcium carbonate mineral inside the reaction equalizing tank and the microorganism. That is, the treatment units of the waste water and exhaust gas are integrated with each other, thereby effectively utilizing the installation area. It is to be noted that the reference numeral 107 denotes a sludge concentrating tank and the reference numeral 108 denotes a filter press in the figure.

The example shown in FIG. 13, which is a compact treatment unit for efficiently treating the fluorine and organic matter discharged from the semiconductor plant or the liquid crystal plant, has the problems i), ii) and iii) with regard to the waste water treatment and the problems iv) and v) with regard to the exhaust gas treatment as follows.

i) In order to allow the waste water to flow between the stowed calcium carbonate mineral pieces, there is selected calcium carbonate mineral having a relatively large diameter of 2 to 7 cm, and the mineral is used entirely in a fixed state. Therefore, calcium fluoride generated as a consequence of the reaction of the fluorine in the waste water with calcium remains between the calcium carbonate mineral pieces in the fixed state and becomes a, mass after a long-time operation. Then, the mass gradually increases to spread throughout the tank, and this leads to a reduced contact between the waste water and the calcium carbonate mineral, resulting in reduced treatment efficiency.

ii) The treatment unit has a height of up to several meters on the plant scale, and the replenishment inlet of the calcium carbonate mineral is located in a high position above the center portion, and therefore, the tank is hard to be automatically replenished with the calcium carbonate mineral having a size of a diameter of 2 to 7 cm.

iii) The calcium carbonate mineral is relatively inexpensive. However, the material pieces having a size of a diameter of 2 to 7 cm are availed less on the market, and it is to inevitably be a custom-made article, resulting in a high cost.

iv) As the filler in the upper section of the first reaction tank, there has been stowed calcium carbonate mineral having a diameter of 5 to 7 cm. Therefore, the filler has an air resistance and a small amount of treatment air flow rate in comparison with the equipment scale. Furthermore, as the filler in the upper section of the second reaction tank, there has been stowed charcoal having a diameter of 5 to 7 cm. Therefore, the filler also has an air resistance and a small amount of treatment air flow rate in comparison with the equipment scale.

v) The crystalline calcium fluoride (crystal seed) has an insufficient surface area and an insufficient exhaust gas treatment capability.

SUMMARY OF THE INVENTION

Accordingly, the object of the present invention is to provide reasonable and economical waste water treatment equipment and waste water treatment method capable of concurrently treating the waste water containing fluorine and organic matter such as surfactant and the exhaust gas containing fluorine and organic matter and reducing the initial cost and the running cost.

In order to achieve the aforementioned object, there is provided a waste water treatment method comprising the steps of: flowing a granular calcium carbonate mineral in a waste water introduced into a lower section; sprinkling the waste water including the granular calcium carbonate mineral over an exhaust gas introduced into an upper section; and circulating the waste water from the upper section to the lower section and from the lower section to the upper section.

According to the above method, the granular calcium carbonate mineral flowing in the lower section is introduced into the upper portion and sprinkled. Therefore, the fluorine in the waste water can be treated through chemical reaction by the calcium carbonate mineral flowing in the lower section, and the fluorine in the exhaust gas can be treated through chemical reaction by the calcium carbonate mineral sprinkled in the upper section. Then, the granular calcium carbonate mineral that has not been utilized through the exhaust gas treatment in the upper section (i.e., the unreacted calcium carbonate mineral) is introduced again into the lower section to chemically treat the fluorine in the waste water. Therefore, according to the above method, the waste water treatment in the lower section and the exhaust gas treatment in the upper section can be concurrently performed by skillfully utilizing the form and properties of the granular calcium carbonate mineral.

The granular calcium carbonate having a particle diameter of about several millimeters used in accordance with the above method is produced most on the market and has a low price of about one third of that of the calcium carbonate having a particle diameter of 2 to 7 centimeters. Furthermore, the above granular calcium carbonate mineral has a great surface area and is also allowed to have an improved chemical treatment capability. Therefore, compact treatment equipment can be provided and the air flow rate necessary for aeration can be reduced, thereby saving the cost for electricity. Therefore, if the present invention is adopted, reasonable and economical waste water treatment equipment capable of reducing the initial cost and the running cost can be constructed.

The calcium carbonate mineral having a diameter of 2 to 7 centimeters cannot be put into the water tank by means of the existing pneumatic transportation tank lorry that uses a compressed air for the replenishment. In contrast to this, the calcium carbonate mineral having a diameter of not greater than 2 mm has the advantage that the existing pneumatic transportation lorry that uses a compressed air can be used.

Also, there is provided a waste water treatment method comprising the steps of: flowing a granular calcium carbonate mineral, calcium fluoride in a floc form and a microorganism in a waste water introduced into a lower section; sprinkling the waste water including the granular calcium carbonate mineral, the calcium fluoride in the floc form and the microorganism over an exhaust gas introduced into an upper section; and circulating the waste water from the upper section to the lower section and from the lower section to the upper section.

According to the above method, the granular calcium carbonate mineral, the calcium fluoride in the floc form and the microorganism flowing in the lower section are introduced into the upper portion and sprinkled. Therefore, in the upper portion, the granular calcium carbonate mineral chemically treats the fluorine in the exhaust gas, the calcium fluoride in the floc form also chemically treats the acid components in the exhaust gas although the effect is little, and concurrently the microorganism biologically treats the organic matter in the exhaust gas. Then, the granular calcium carbonate mineral (i.e., the unreacted granular calcium carbonate mineral), the calcium fluoride and the microorganism that have not been utilized through the exhaust gas treatment treat again the waste water in the lower section.

Therefore, according to the above method, the waste water is treated in the lower section and the exhaust gas is concurrently treated in the upper section, so that the waste water containing the fluorine and the organic matter and the exhaust gas can be concurrently treated. It is to be noted that the organic matter in the waste water includes a surfactant and an organic solvent, while the organic matter in the exhaust gas specifically includes IPA (isopropyl alcohol), acetone and so on.

In an embodiment of the present invention, the granular calcium carbonate mineral has a particle diameter of 0.1 millimeter to 2.0 millimeters.

The above embodiment is advantageous in terms of initial cost, treatment capability and running cost as compared with the case where the calcium carbonate mineral having a larger particle diameter is used as described earlier.

Also, there is provided a waste water treatment method comprising the steps of:
flowing a granular calcium carbonate mineral in waste water introduced into a lower section;
sprinkling the waste water including calcium fluoride in a floc form and a microorganism generated in the lower section over an upper section in which an adhesion medium is arranged and an exhaust gas is introduced; and
circulating the waste water from the upper section to the lower section and from the lower section to the upper section.

According to the above method, the calcium fluoride in the floc form and the microorganism generated in the lower section are sprinkled over the adhesion medium in the upper section. The calcium fluoride in the floc form generated from the granular calcium carbonate mineral has an adhesive or adhesion property and assists the microorganism to adhere to the sludge adhesion medium. Therefore, the calcium fluoride in the floc form and the microorganism adhere to the sludge adhesion medium, and their capabilities can be further improved by the amount of adhesion. The calcium fluoride in the floc form chemically neutralizes the acid components in the exhaust gas although the effect is little, while the microorganism biologically treats the organic matter in the exhaust gas.

In an embodiment of the present invention, the adhesion medium is made of a resin and made to have a relatively large surface area.

According to the above embodiment, the adhesion medium is made of a resin having a relatively large surface area. With this arrangement, a greater amount of calcium fluoride in the floc form and microorganism can be made to adhere to the medium, thereby allowing the treatment effect of the organic matter or the like to be increased. If this adhesion medium is made of a resin net, then the exhaust gas can be treated with a reduced air resistance without generating any pressure loss. Furthermore, if a resin net having a fine mesh is selected, then the surface area of the net can be totally increased, so that a greater amount of calcium fluoride in the floc form and microorganism can be made to adhere to the net.

In the case of a large calcium carbonate mineral, which is used in a fixed system, the calcium fluoride grows from its place to become a crystal seed and solidified. However, in the case of the flowing system, the granular calcium carbonate is always stirred by the water flow and aeration. Therefore, the calcium fluoride generated through the reaction becomes the calcium fluoride in the floc form on the aforementioned conditions and is not solidified.

In order to achieve the aforementioned object, there is provided waste water treatment equipment comprising:
a lower section in which a waste water is introduced and a granular calcium carbonate mineral is made to flow in the waste water; and
an upper section in which an exhaust gas is introduced and the waste water including the granular calcium carbonate mineral is introduced from the lower section and sprinkled, whereby the waste water is circulated from the upper section to the lower section and from the lower section to the upper section.

According to the above constitution, the fluorine in the waste water can be treated through chemical reaction by the calcium carbonate mineral flowing in the lower section, and the fluorine in the exhaust gas can be treated through chemical reaction by the calcium carbonate mineral sprinkled in the upper section. Then, the granular calcium carbonate mineral that has not been utilized through the exhaust gas treatment in the upper section (i.e., the unreacted calcium carbonate mineral) is introduced again into the lower section to chemically treat the fluorine in the waste water. Therefore, according to the above constitution, the waste water treatment in the lower section and the exhaust gas treatment in the upper section can be concurrently performed by skillfully utilizing the form and properties of the granular calcium carbonate mineral.

Also, there is provided waste water treatment equipment comprising:

a water tank lower section in which a waste water is introduced from below and a granular calcium carbonate mineral is made to flow in the waste water by a stirring means for stirring the waste water;

a water tank upper section which is arranged above a water level of the waste water in the water tank lower section and in which an exhaust gas is introduced and a sludge adhesion section constructed so as to have a water flowability is provided;

a waste water circulating means for pumping up the waste water from above the water tank lower section into the water tank upper section and sprinkling the pumped-up waste water on the water tank upper section; and an exhaust gas introducing means for introducing an exhaust gas into a space section between the water tank lower section and the water tank upper section.

According to the above constitution, the waste water is introduced from the lower portion of the water tank lower section, and the introduced waste water is stirred by the stirring means to flow the calcium carbonate mineral in the waste water. With this arrangement, the calcium carbonate mineral can be made to efficiently react chemically with the fluorine in the waste water. On the other hand, in the water tank upper section, the waste water is pumped up into the sludge adhesion section that is constructed so as to have a water flowability, the pumped-up waste water is sprinkled and the exhaust gas is introduced into the space section between the water tank upper section and the water tank lower section. This exhaust gas is brought in contact with the sprinkled water, so that the fluorine and organic matter are removed. Further, the organic matter in the exhaust gas and the organic matter in the waste water are concurrently treated by the microorganism that adheres to the sludge adhesion section.

Therefore, according to the above constitution, the fluorine in the waste water can be efficiently treated by the calcium carbonate mineral in the flowing state in the water tank lower section. The waste water and the exhaust gas can be concurrently treated in the water tank upper section, and therefore, reasonable and economical waste water treatment equipment capable of reducing the initial cost and the running cost can be provided.

Also, there is provided waste water treatment equipment comprising:

a water tank lower section which has a granular calcium carbonate mineral that is stowed so as to flow in an introduced waste water, a stirring means for stirring the waste water and a non-stirring region that is not stirred by this stirring means;

a water tank upper section which is arranged above the water tank lower section and a water level of the waste water introduced into the water tank lower section and which has a sludge adhesion section having an adhesion medium that is constructed so as to have a water flowability;

a first waste water circulating means for pumping up the waste water containing calcium fluoride in a floc form and a microorganism from the non-stirring region of the water tank lower section and sprinkling the waste water on the sludge adhesion section of the water tank upper section;

a second waste water circulating means for pumping up the waste water containing the calcium carbonate mineral, the calcium fluoride in the floc form and the microorganism from a stirring region of the water tank lower section and sprinkling the waste water on a portion that belongs to the water tank upper section and is other than the sludge adhesion section; and an exhaust gas introducing means for introducing an exhaust gas into a space between the lower section and the upper section.

According to the above constitution, the fluorine in the introduced waste water is made to efficiently chemically react with the stirred flowing granular calcium carbonate mineral, so that the fluorine in the waste water is treated. The organic matter in the waste water can be biologically treated by the microorganism propagating in the waste water. On the other hand, in the water tank upper section, the calcium fluoride in the floc form and the microorganism are made to adhere to the sludge adhesion section having an adhesion medium that is constructed so as to have a water flowability, and the organic matter in the exhaust gas can be biologically treated by this microorganism. The fluorine in the exhaust gas is treated by being made to chemically react with the granular calcium carbonate mineral to become calcium fluoride, while the acid components in the exhaust gas is neutralized by the calcium carbonate mineral. Then, the acid components in the exhaust gas are neutralized by the calcium fluoride in the floc form adhering to the sludge adhesion section, although the effect is little.

In an embodiment of the present invention, the stirring means performs stirring by aeration.

According to the above embodiment, the water tank lower section is aerated by the aeration by the stirring means, so that the microorganism can be propagated by the aeration. Therefore, the organic matter treatment efficiency in the waste water and the exhaust gas by the microorganism can be improved.

Also, there is provided waste water treatment equipment comprising:

a first water tank and a second water tank, the first water tank in which a waste water is introduced and reserved, the first water tank having a waste water introducing means for introducing a reserved waste water into the second water tank, the second water tank being the waste water treatment equipment claimed in claim 8;

a third water tank in which the waste water from the second water tank is introduced, the third water tank having a stirring means for stirring the introduced waste water and receiving an aluminum agent put therein;

a fourth water tank in which a macromolecular coagulant is put;

a fifth water tank in which the waste water from the fourth water tank is introduced, the fifth water tank performing solid-liquid separation of the waste water and discharging separated supernatant liquid;

a sixth water tank in which the sludge formed through precipitation in the fifth water tank is introduced, the sixth water tank condensing the sludge through sedimentation;

a dehydrating means for dehydrating the sludge that is condensed in the sixth water tank and introduced into the dehydrating means; and a sludge returning means for returning the sludge precipitated in the fifth water tank or the sludge condensed in the sixth water tank to at least one of the second water tank and the third water tank.

According to the above constitution, the waste water introduced into the first water tank is introduced into the second water tank after being reserved in the first water tank, and the fluorine in the introduced waste water efficiently chemically reacts with the granular calcium carbonate mineral by stirring, so that the fluorine in the waste water is treated.

The organic matter in the waste water can be biologically treated by the microorganism propagated in the waste water. On the other hand, the waste water in the second water tank lower section is pumped up and sprinkled, and therefore, the granular calcium carbonate mineral, the calcium fluoride in the floc form and the microorganism adhere to the adhesion section in the second water tank upper section. Then, the organic matter in the exhaust gas from the space section is biologically treated by the adhering microorganism. The fluorine in the exhaust gas is treated through chemical reaction by the calcium carbonate mineral. The acid components in the exhaust gas are chemically neutralized by the calcium fluoride in the floc form, although the effect is little.

Next, the waste water from the second water tank is introduced into the third water tank, and the aluminum agent is added to cause a coagulation reaction, so that the floc of calcium fluoride has an increased strength. The increase in strength means that the floc becomes a floc of a better size and becomes a floc that easily sinks. In the third water tank, the unreacted fluorine that have not been treated in the second water tank are made to react with the aluminum agent, thereby further treating the fluorine.

Next, the waste water is introduced from the third water tank into the fourth water tank. The macromolecular coagulant is put in this fourth water tank. With the added macromolecular coagulant, the floc of calcium fluoride becomes a larger floc.

Next, the waste water introduced from the fourth water tank into the fifth water tank that serves as a sedimentation tank is subjected to solid-liquid separation so as to be separated into a supernatant liquid and a sludge as a floc. The sludge of calcium fluoride precipitated in the fifth water tank is introduced further into the sixth water tank that serves as a condensation tank so as to be condensed there. In the calcium fluoride sludge precipitated in the fifth water tank and the sludge condensed in the sixth water tank, an anaerobic microorganism propagates using the small amount of organic matter in the waste water as nutrition due to the interruption of oxygen supply. With this arrangement, the sludge including the anaerobic microorganism is sent back to the second water tank or the third water tank by the sludge returning means and used for treating the hydrogen peroxide that serves as an oxidizing agent existing in the waste water.

The reason why the anaerobic microorganism treats the hydrogen peroxide that serves as the oxidizing agent is that the anaerobic microorganism has reducibility.

On the other hand, the sludge condensed in the sixth water tank can be dehydrated to a dehydrated cake by means of a filter press. Thus, the fluorine in the waste water is separated and discharged as a dehydrated cake.

As described above, according to the above constitution, the waste water is treated in the second water tank lower section and both the waste water and the exhaust gas are treated in the second water tank upper section, so that the fluorine, organic matter and hydrogen peroxide in the waste water and the fluorine and organic matter in the exhaust gas can be concurrently treated.

In an embodiment of the present invention, the granular calcium carbonate mineral has a particle diameter of 0.1 millimeter to 2.0 millimeters.

This embodiment is advantageous in terms of initial cost, treatment capability and running cost as compared with the case where calcium carbonate mineral having a larger particle diameter is used as described earlier.

In an embodiment of the present invention the sludge to be introduced into the sludge adhesion section is sludge including anaerobic microorganic sludge.

According to the above embodiment, the sludge includes the anaerobic microorganism, and therefore, the sludge of the anaerobic microorganism is introduced into the second water tank, so that the hydrogen peroxide having an acidity in the waste water can be treated through reduction. The organic matter in the waste water and the organic matter in the exhaust gas can be biologically treated by the anaerobic microorganism.

In an embodiment of the present invention, the. third water tank includes a sludge fixing means for fixing the sludge in the introduced waste water.

According to the above embodiment, the sludge can be fixed to the sludge fixing means in the third water tank. Therefore, the microorganic density in the third water tank can be further increased, and the hydrogen peroxide in the waste water can be biologically efficiently treated. Further, the aluminum agent concentration in the third water tank can be increased, so that the fluorine treatment capability in the waste water can be improved.

To this third water tank is sent back the condensed sludge from the sixth water tank by the returning means, and therefore, the sludge whose adhesion property is improved through condensation can be fixed to the sludge fixing means of the third water tank in high concentration.

In an embodiment of the present invention, slaked lime is put into the third water tank.

According to the above embodiment, the phosphor in the waste water is formed into calcium phosphate by adding slaked lime in the third water tank and precipitated in the fifth water tank, thereby allowing the treatment thereof as a precipitate.

In an embodiment of the present invention, the aluminum agent put in the third water tank is polychlorinated aluminum.

According to the above embodiment, polychlorinated aluminum is used as the aluminum agent in the third water tank to cause a coagulation reaction, thereby allowing the strength of the floc of calcium fluoride to be increased.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described below in connection with the embodiments thereof with reference to the drawings.

First Embodiment

Figure 1:
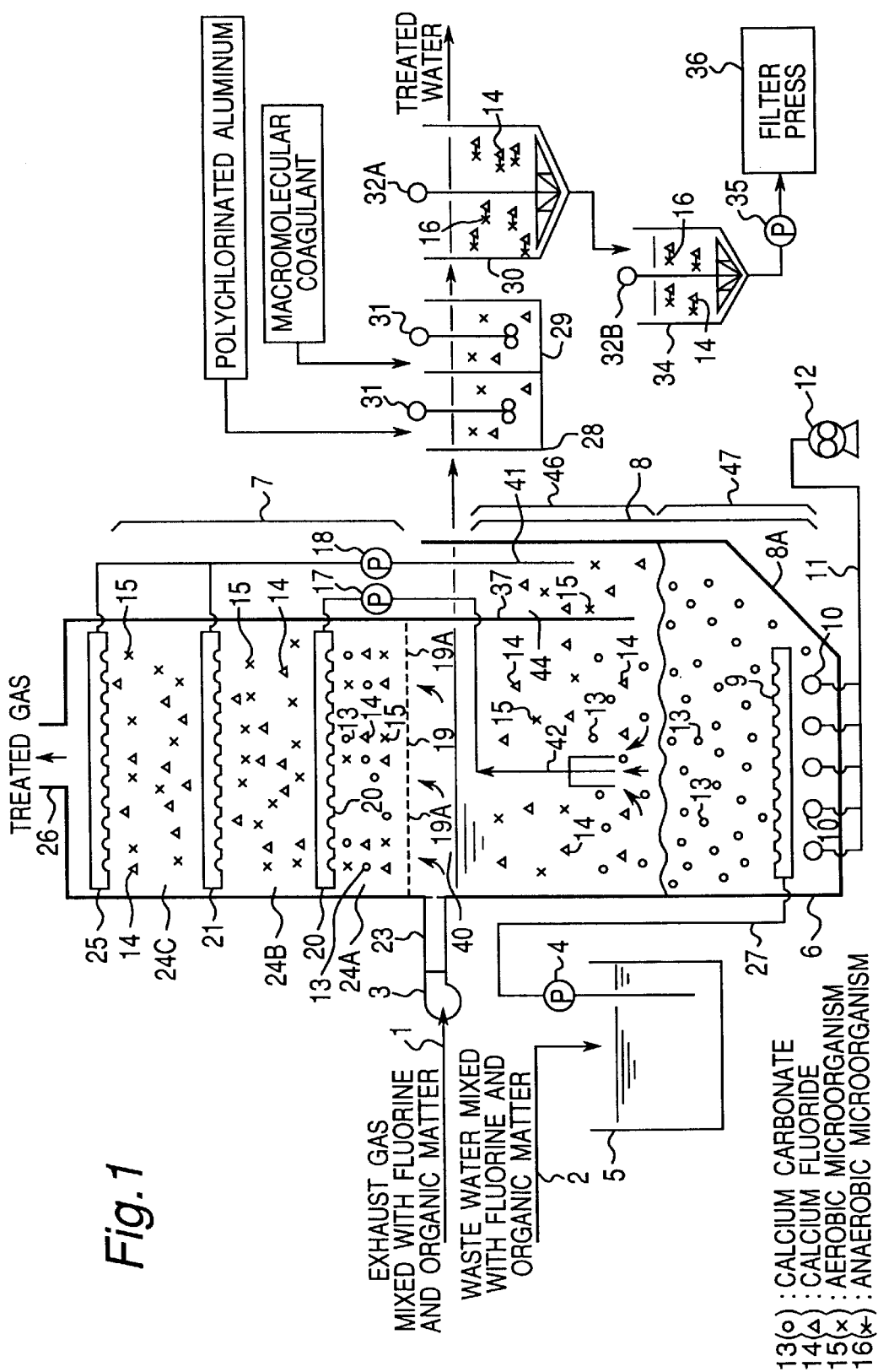
FIG. 1 is a view showing waste water treatment equipment according to a first embodiment of the present invention.

FIG. 1 shows waste water treatment equipment of the first embodiment of the present invention. This first embodiment is to treat waste water containing fluorine and organic matter as well as an exhaust gas containing fluorine and organic matter.

This waste water treatment equipment is provided with a first water tank 5, a second water tank 6, a third water tank 28, a fourth water tank 29, a fifth water tank 30, a sixth water tank 34 and a filter press 36.

The waste water containing fluorine and organic matter flows into the first water tank 5 from a drain pipe 2. The waste water is conveyed and introduced into the second water tank 6 by a first water tank pump 4.

The second water tank 6 is a reaction equalizing tank and is provided with a second water tank lower section 8, a space section 40 and a second water tank upper section 7 in this order in an upward direction. The second water tank lower section 8 has a second water tank lower section lower portion 47 and a second water tank lower section upper portion 46.

The second water tank lower section 8 is stowed with a granular calcium carbonate mineral 13 having a particle diameter of approximately 0.5 mm in a flowing state within a range of about 20% to 50% of the capacity of the second water tank lower section 8. This second water tank lower section 8 has a plurality of diffuser pipes 10 arranged at the bottom, and the diffuser pipes 10 are connected to a blower 12 by way of an air pipe 11. The blower 12, the air pipe 11 and the diffuser pipes 10 constitute an aerating means. Air discharged from the diffuser pipes 10 maintains the granular calcium carbonate mineral 13 in the flowing state.

In more detail, the calcium carbonate mineral 13 located in the second water tank lower section lower portion 47 is in a weak flowing state since it has a specific gravity of 2.7 and stowed in large quantities.

On the other hand, in the second water tank lower section upper portion 46, the calcium carbonate mineral 13 is in a blown-up state due to the air blown from the blower 12.

Calcium is dissolved from this calcium carbonate mineral 13 by acids such as hydrofluoric acid, sulfuric acid and nitric acid included in the waste water that contains fluorine and organic matter and is introduced by way of the first water tank 5. The waste water is discharged through the production process of the semiconductor plant or the liquid crystal plant.

The water level of the waste water inside the second water tank 6 is adjusted so that the calcium carbonate mineral 13 is infallibly submerged. The aeration condition is adjusted so that a portion where the calcium carbonate mineral 13 is in a strong flowing state (second water tank lower section upper portion 46) and a portion where the calcium carbonate mineral 13 is in a weak flowing state (second water tank lower section lower portion 47) are provided. For example, in the case of a calcium carbonate mineral 13 having a particle diameter of 0.5 mm, the air flow rate of the blower 12 is set to 100 to 160 ($m^3$/day) per volume of 1 $m^3$ of the second water tank lower section 8.

Thus, by the air discharged from the diffuser pipes 10, the waste water is strongly stirred in the second water tank lower section upper portion 46. On the other hand, in the second water tank lower section lower portion 47, the granular calcium carbonate mineral 13 and the waste water react with each other in the weak flowing state, thereby generating a calcium fluoride 14 in a floc form.

The structure of the second water tank upper section 7 arranged above the second water tank lower section 8 with interposition of the space section 40 will be described next. In this second water tank upper section 7, a current regulating plate 19 is arranged in a lowermost position that defines a border next to the space section 40. This current regulating plate 19 has a plurality of apertures 19A through which the exhaust gas from the space section 40 passes. The second water tank upper section 7 has three water sprinkling pipes 20, 21 and 25 arranged at specified intervals above the current regulating plate 19. These three water sprinkling pipes 20, 21 and 25 extend from one end to the other end in the horizontal direction of the second water tank upper section 7.

The water sprinkling pipe 20 in the first tier is connected to a pump 17, and this pump 17 is connected to a suction pipe 42 that is trifurcated in a lower portion of the second water tank lower section upper portion 46. Therefore, the waste water that includes the calcium carbonate mineral 13, the calcium fluoride 14 in the floc form and the microorganism 15 and is flowing in the second water tank lower section upper portion 46 is drawn from the suction pipe 42 and sprinkled over the lower region (first region 24A) from the water sprinkling pipe 20 in the first tier by way of the pump 17.

As shown in FIG. 1, the suction pipe 42, which is multi-furcated in the second water tank lower section upper portion 46, is able to pump up the waste water from a wide region of the lower section upper portion 46 and able to prevent the biased pumping.

On the other hand, the water sprinkling pipe 21 in the second tier and the water sprinkling pipe 25 in the third tier are connected to a suction pipe 41 by way of a pump 18. This suction pipe 41 is opening inside a separation chamber 44. The waste water inside the separation chamber 44 is pumped up from the suction pipe 41 by the driving of the pump 18 and sprinkled over the lower regions (second and third regions 24B and 24C) from the water sprinkling pipes 21 and 25. The waste water to be sprinkled includes the calcium fluoride 14 in the floc form and the aerobic microorganism 15, however, it does not include the granular calcium carbonate mineral 13. This is because the calcium carbonate mineral 13 sinks from the separation chamber 44 and moves to the second water tank lower section lower portion 47.

To the space section 40 is connected a fan ventilation duct 23, and a fan 3 is connected to this fan ventilation duct 23. Then, to this fan 3 is connected an exhaust gas duct 1. Into this exhaust gas duct 1 is introduced the mixed gas of fluorine and organic matter from the semiconductor plant or the liquid crystal plant. The exhaust gas introduced into the space section 40 passes through the apertures 19A of the current regulating plate 19 and has its upward flow rate adjusted to be introduced into the first region 24A below the water sprinkling pipe 20. In this first region 24A, the waste water including the granular calcium carbonate mineral 13, the calcium fluoride 14 in the floc form and the aerobic microorganism 15 is sprinkled, so that the fluorine and organic matter in the exhaust gas are treated.

That is, the fluorine in the exhaust gas becomes calcium fluoride as a consequence of chemical reaction with the granular calcium carbonate mineral 13 sprinkled from the water sprinkling pipe 20 in the first tier. The organic matter in the exhaust gas is neutralized by the sprinkled calcium fluoride 14 in the floc form, although the effect is little. As acid components in this exhaust gas, there are specifically a hydrofluoric acid mist attributed to hydrofluoric acid, a sulfuric acid mist attributed to sulfuric acid and a nitric acid mist attributed to nitric acid used in the plant. As described above, the hydrofluoric acid and the acid components in the exhaust gas are chemically treated in the space section 40 and the first region 24A below the water sprinkling pipe 20 in the first tier to consequently have a reduced concentration.

Further, the exhaust gas is introduced into the second region 24B below the water sprinkling pipe 21 in the second tier and then introduced into the third region 24C below the water sprinkling pipe 25 in the third tier, so that the components of the exhaust gas are physically adsorbed by the calcium fluoride 14 and the aerobic microorganism 15 sprinkled there. By this operation, the hydrofluoric acid, the acid components and the organic matter in the exhaust gas are treated through adsorption by the sludge of the calcium fluoride 14 and the sludge of the aerobic microorganism 15. Then, the thus-treated exhaust gas is discharged from a ventilation port 26 at the ceiling.

It is preferable to design the second water tank 6 so that the waste water at the exit of the separation chamber 44 treated in the second water tank 6 comes to have neutrality. Specifically, when the pH of the waste water containing the fluorine and organic matter is not greater than three, it is preferable to make the retention time of the waste water in the second water tank 6 not shorter than two hours, also depending on the stirring strength. If an aeration air amount of not smaller than 100 cubic meters is secured a day per cubic meter of the lower section 8 of the second water tank 6, then the stirring of the waste water inside the second water tank lower section 8 can be sufficiently performed, and the reaction of the fluorine in the waste water with the granular calcium carbonate mineral 13 can be made smooth. Therefore, the calcium fluoride 14 in the floc form generated through this reaction can be effectively utilized for the exhaust gas treatment.

The bottom surface of the second water tank lower section 8 is inclined upward from the region where the diffuser pipes 10 are arranged toward the end wall in the region below the separation chamber 44, and no diffuser pipe is arranged in this inclined surface 8A. With this arrangement, the calcium carbonate mineral 13 descends in the separation chamber 44 and descends along the inclined surface 8A. Therefore, this arrangement prevents the calcium carbonate mineral 13 from being pumped up from the separation chamber 44 and concurrently prevents the calcium carbonate mineral 13 from flowing out of the separation chamber 44. On the other hand, the calcium fluoride 14 in the floc form and the aerobic microorganism 15, which have a small specific gravity, are pumped up by the water sprinkling pump 18 or flow out of the separation chamber 44. That is, the calcium fluoride 14 in the floc form serving as a reaction substance and the aerobic microorganism 15 eventually flow out of the separation chamber 44, whereas the calcium carbonate mineral 13 that serves as a treatment material of fluorine does not flow out of the water tank from the separation chamber 44 of the second water tank lower section 8.

The waste water introduced into the second water tank 6 is circulated from the second water tank lower section 8 to the second water tank upper section 7 and from the second water tank upper section 7 to the space section 40 by the pumps 17 and 18. By this operation, the fluorine in the waste water is made to react with the calcium carbonate mineral 13 that is strongly flowing in the second water tank lower section 8, thereby making the fluorine concentration in the waste water not greater than 20 ppm and making. the pH of the waste water come closer to seven. Further, in the upper portion 46 of the second water tank lower section 8, the biological treatment by the microorganism for taking in and accumulating fluorine into the body of the microorganism is executed, thereby reducing the fluorine concentration in the waste water to 15 ppm or less.

Next, the waste water whose fluorine and organic matter have been treated (i.e., the treated water) is introduced into the third water tank (reaction tank) 28. Specifically, the waste water treated in the second water tank lower section 8 is conveyed to the third water tank 28 by way of an overflow pipe (not shown) provided in a specified position above the separation chamber 44 of the second water tank lower section 8 and below the space section 40.

An aluminum agent (polychlorinated aluminum) that serves as a coagulant is put into the third water tank 28 for the formation of a floc core, while a macromolecular coagulant is put into the fourth water tank 29 for the enlargement of the floc. The coagulant has a greater effect as the waste water comes closer to the neutrality, when the fluorine can be efficiently removed from the waste water.

The waste water that has undergone the treatment in the fourth water tank 29 is then conveyed to the fifth water tank 30. This fifth water tank 30 performs the same treatment as that of the general sedimentation tank. Then, the sixth water tank 34 that is the general sludge condensation tank condenses the sludge from the fifth water tank 30. Then, this condensed sludge is conveyed to the filter press 36 that serves as a dehydrator so as to be dehydrated there.

In the present embodiment, the second water tank upper section 7 and the space section 40 of the second water tank 6 constitute the exhaust gas treatment equipment. Further, in this embodiment, the second water tank lower section 8 is stowed with the granular calcium carbonate mineral 13, and by an aeration unit that serves as a stirring means, the waste water is neutralized and the fluorine included in the waste water is made to react with the granular calcium carbonate mineral 13. By this operation, the treatment for reducing the fluorine concentration in the waste water and the treatment of the organic matter and fluorine in the waste water by the aerobic microorganism 15 can be performed. The treatment of fluorine is to accumulate fluorine inside the body of the microorganism.

In the waste water treatment equipment having the above construction, first, the waste water including fluorine and organic matter from the plant flows from the drain pipe 2 into the first water tank 5. This first water tank 5 plays the role of a mere pit. The waste water in the first water tank 5 is pumped up by the pump 4 and made to pass through a pipe 27 and poured into the second water tank lower section lower portion 47 from an inflow pipe 9. The waste water immediately after being poured has an acidity of not greater than pH 3. Therefore, the waste water ionizes calcium while dissolving therein the granular calcium carbonate mineral 13, thereby forming the fluorine included in the waste water into a floc of calcium fluoride. With this treatment, carbon dioxide and water are generated. In this embodiment, the second water tank lower section 8 concurrently serves as the conventional equalizing tank and the reaction tank, and therefore, the time of reaction can be made longer in the second water tank lower section 8 than in the conventional reaction tank. Therefore, in the second water tank lower section 8, the fluorine included in the waste water can be treated at an extraction ratio of not smaller than 60%.

Next, the waste water that has a fluorine concentration of not greater than 20 ppm and comes closer to the neutrality in the second water tank lower section lower portion 47 rises upward to the second water tank lower section upper portion 46. It is preferable to set the retention time of the water to be treated not shorter than one hour.

In this second water tank lower section upper portion 46, due to the fact that the waste water comes closer to the neutrality, the fact that the aeration is performed by air including the microorganism, the fact that the microorganism exists in the waste water, the microorganism is propagating and flowing. Then, the organic matter in the waste water is treated by this flowing aerobic microorganism 15. This flowing aerobic microorganism 15 circulates the exhaust gas treatment equipment constituted by the second water tank upper section 7, the space section 40 and the waste water treatment equipment constituted by the second water tank lower section upper portion 46, thereby biologically treating the waste water and the exhaust gas. If the organic matter such as the surfactant and the organic solvent are considered as COD (Chemical Oxygen Demand), then an organic matter extraction ratio of not smaller than 40% can be expected.

The waste water treated in the second water tank lower section 8 is then conveyed to the third water tank 28. Then, in the third water tank 28, an aluminum agent such as polychlorinated aluminum is added as an inorganic coagulant. A macromolecular coagulant is put in the fourth water tank 29. In the third water tank 28, the aluminum agent and the fluorine included in the waste water react with each other to produce aluminum fluoride in addition to the coagulation of the calcium fluoride, and the excessive aluminum agent swiftly changes into a floc of aluminum hydroxide to absorb the aluminum fluoride. By these operations, the fluorine concentration in the waste water can be reduced to about 5 ppm.

It is known that the floc of aluminum hydroxide tends to occur in an environment of neutrality or weak alkalinity. It is to be noted that the time of reaction in the third water tank 28 is allowed to be about 15 minutes.

Then, in the fourth water tank 29, a macromolecular coagulant is added, as a consequence of which the floc in the third water tank 28 becomes a floc that is larger and more stable by the macromolecular coagulant. Next, the waste water including the floc that is larger and more stable is introduced into the fifth water tank 30 that is a sedimentation tank. In this fifth water tank 30, a clarifier 32A is rotated at a rotating speed of about one turn per several minutes, thereby performing solid-liquid separation. Then, the waste water as a supernatant liquid is discharged as a treated water, while the sludge formed through precipitation is introduced into the sixth water tank 34 that is the sludge condensation tank. In this sixth water tank 34, the sludge is clarified by a clarifier 32B and condensed through sedimentation taking three hours or more. Subsequently, the sludge condensed through sedimentation is conveyed to the filter press 36 that serves as a dehydrator so as to be dehydrated there. This filter press 36 generates a dehydrated cake as a final waste.

As described above, according to the first embodiment, the waste water and the granular calcium carbonate mineral 13 are made to react with each other while putting the granular calcium carbonate mineral 13 into the weak flowing state by the aeration from the diffuser pipes 10. With this arrangement, the fluorine concentration in the waste water can be reduced without solidifying the calcium carbonate mineral. Therefore, the fluorine can be stably removed even when a long-time operation is executed.

Furthermore, by the chemical treatment in the lower portion 47 of the water tank lower section 8 and the microorganism generated in the upper portion 46 of the water tank lower section 8, the fluorine in the waste water (fluorine treatment through microorganic condensation) and the organic matter such as the surfactant and organic solvent in the waste water can be concurrently biologically treated in the identical water tank 6.

The unreacted granular calcium carbonate mineral 13 in the second water tank lower section upper portion 46, the calcium fluoride 14 after reaction and the generated microorganism 15 are pumped up into the water tank upper section 7 and then sprinkled from the water sprinkling pipes 25, 21 and 20 of this water tank upper section 7. Therefore, the fluorine and organic matter in the introduced exhaust gas can be concurrently treated chemically and biologically in the one tank 6.

Furthermore, the granular calcium carbonate mineral 13 that has a high reactivity is used for the treatment instead of the large calcium carbonate mineral pieces as observed in the prior art example. Therefore, the equipment can be totally compacted. The fact that the calcium carbonate mineral 13 has a granular form has the advantages that the running cost is inexpensive, pneumatic transportation is enabled and the tank 6 can be easily internally replenished with the mineral.

Although the particle diameter of the calcium carbonate mineral 13 is set to approximately 0.5 mm in the aforementioned embodiment, it is proper to set the particle diameter within a range of 0.1 mm to 2 mm.

Figure 2:
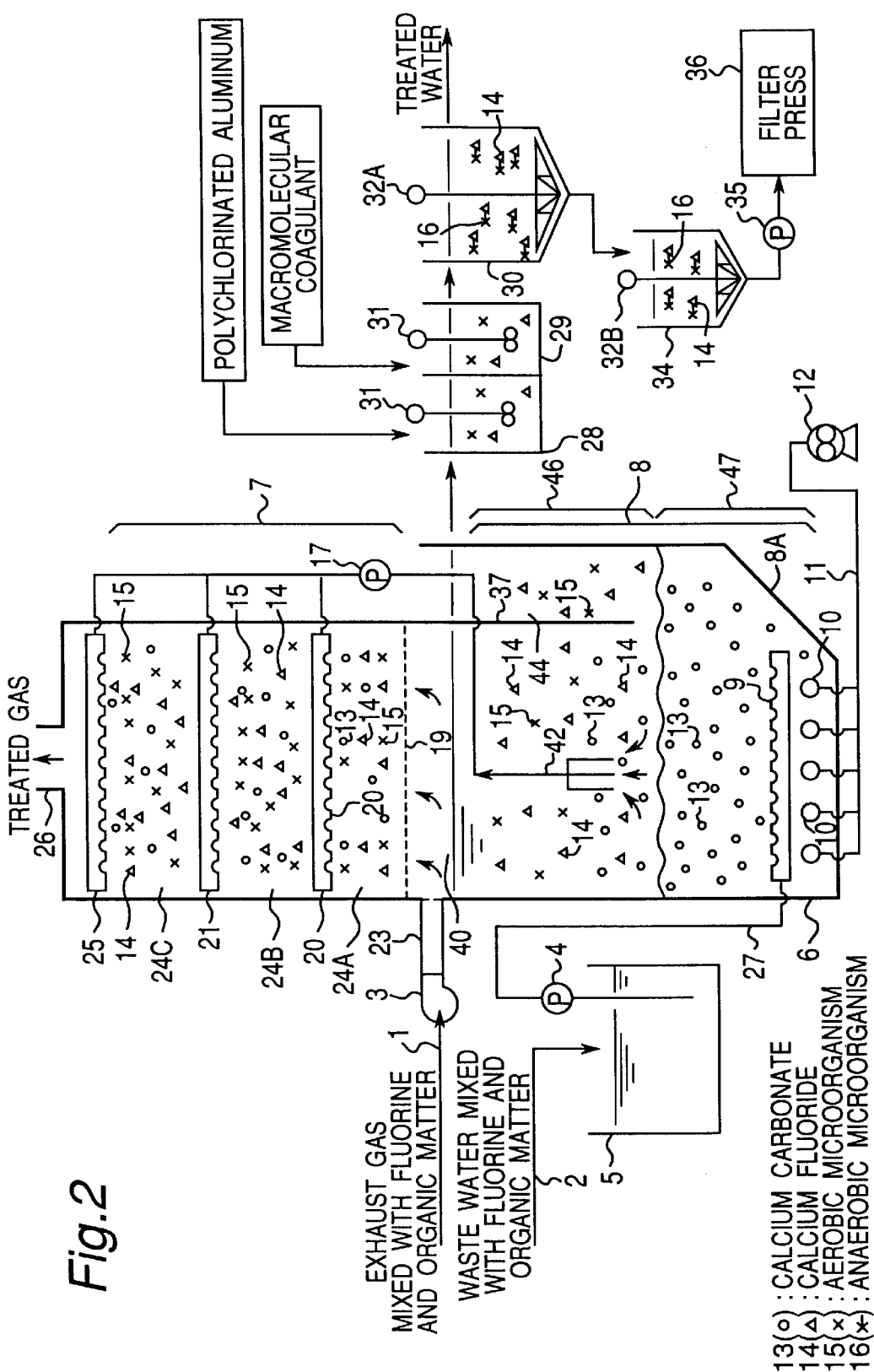
FIG. 2 is a view showing a modification example of the first embodiment.
Figure 3:
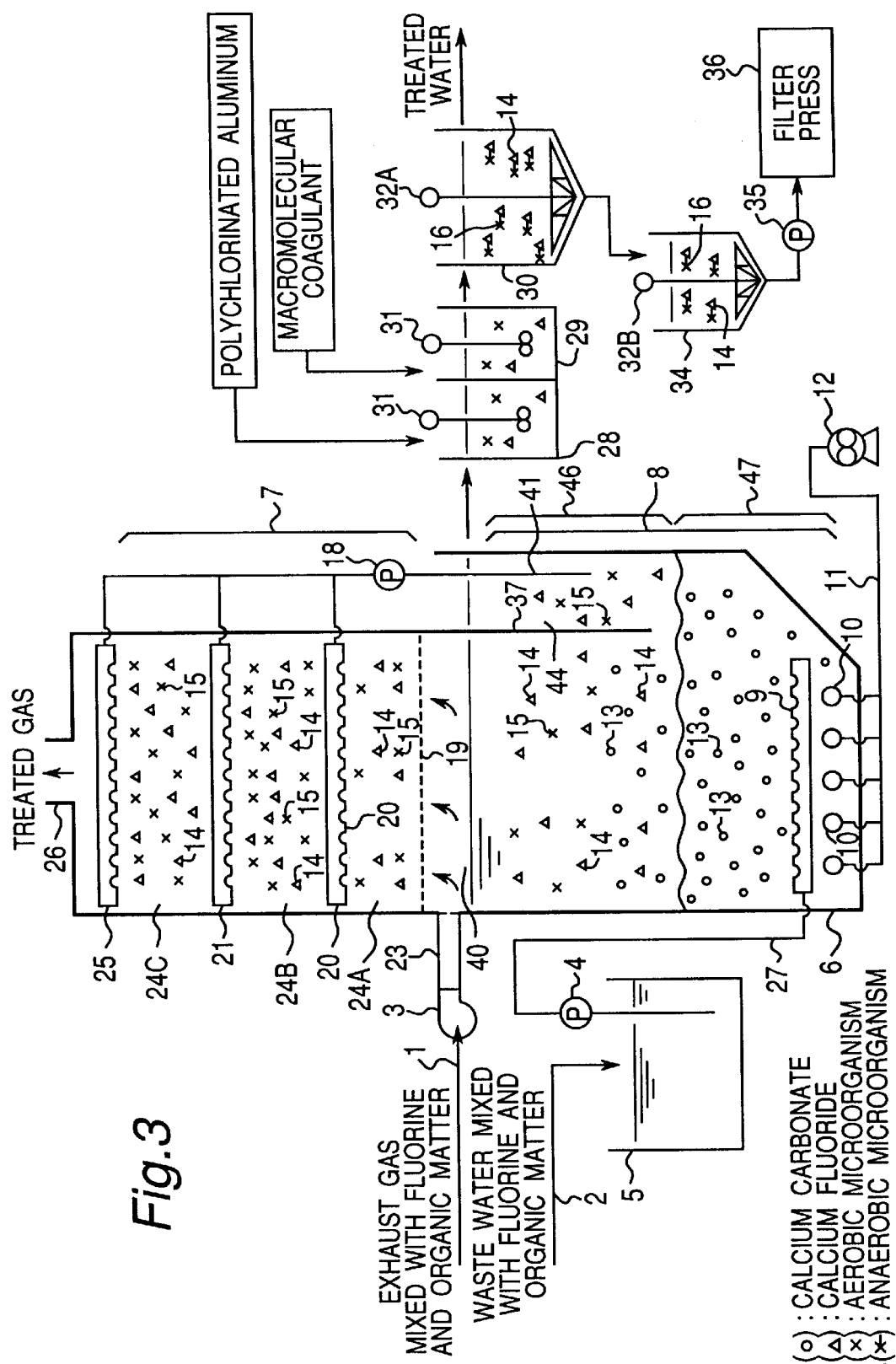
FIG. 3 is a view showing another modification example of the first embodiment.

The two systems of waste water circulating means are provided to perform the circulation of the waste water that is aerated in the second water tank lower section 8 and the circulation of the waste water that is not aerated in the second water tank lower section 8 according to the aforementioned embodiment. However, as shown in FIG. 2, one system of the waste water circulating means may be provided. The waste water circulating means shown in FIG. 2 is constructed so that the pump 18 and the suction pipe 41 of the waste water circulating means shown in FIG. 1 are removed and the three water sprinkling pipes 20, 21 and 25 are all connected to the pump 17. According to the waste water circulating means having the above construction, only the waste water aerated in the second water tank lower section 8 is circulated through the second water tank upper section 7. Furthermore, as shown in FIG. 3, it is acceptable to remove the pump 17 and the suction pipe 42 of the waste water circulating means shown in FIG. 1 and connect all the three water sprinkling pipes 20, 21 and 25 to the pump 18. In this case, only the waste water that is not aerated inside the separation chamber 44 can be circulated through the second water tank upper section 7.

Furthermore, although the waste water is circulated by the water sprinkling pipes 20, 21 and 25 in the three tiers according to the examples shown in FIG. 1, FIG. 2 and FIG. 3, only the water sprinkling pipe 25 in the upper tier may only be used. However, in this case, an aggregate of water is generated in the lower portion, and the waste water treatment efficiency is reduced a little.

Second Embodiment

Figure 4:
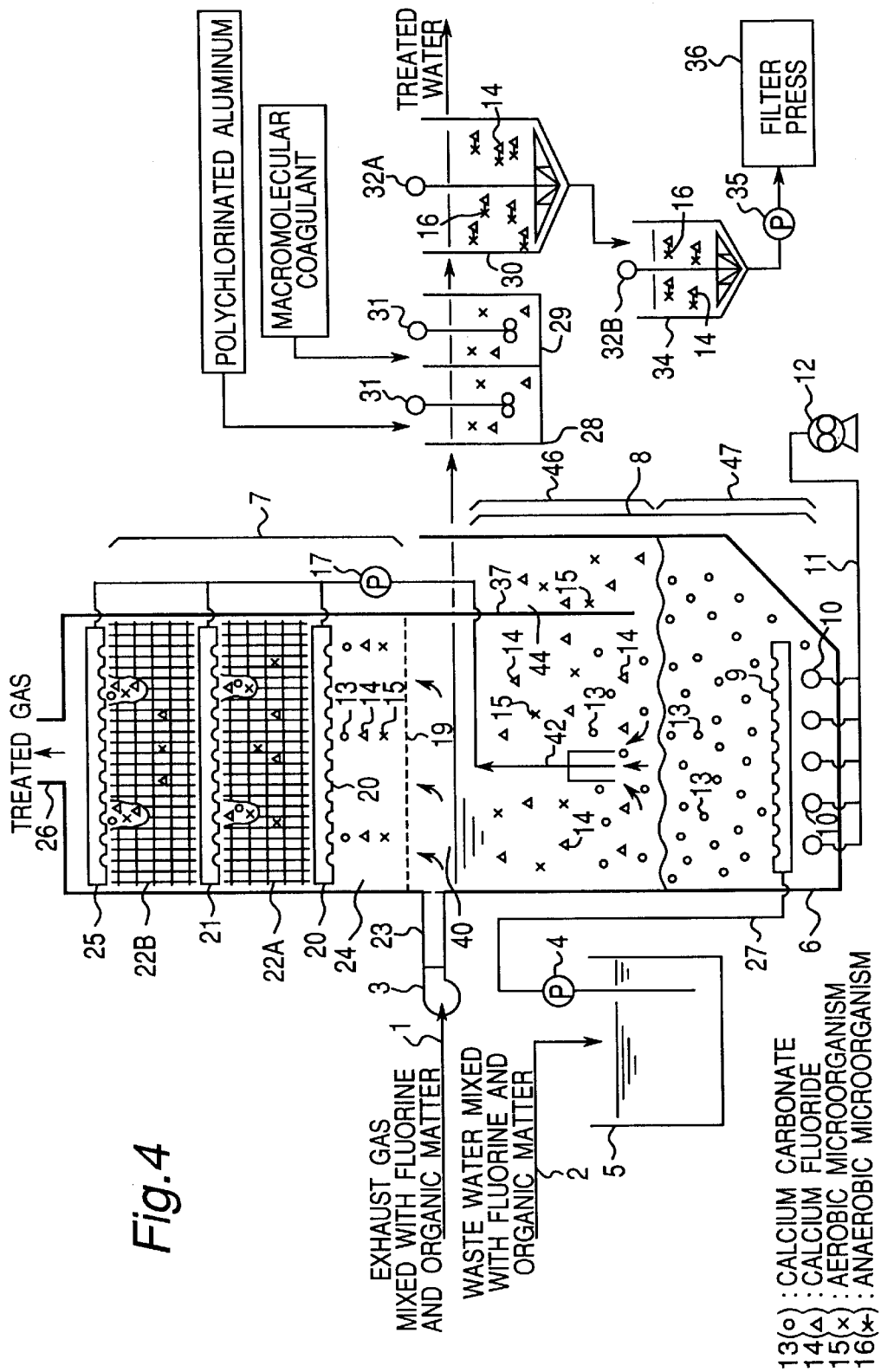
FIG. 4 is a view showing waste water treatment equipment according to a second embodiment of the present invention.

Next, FIG. 4 shows waste water treatment equipment of the second embodiment of the present invention. This second embodiment differs from the aforementioned first embodiment only in the following points i) and ii). Therefore, the same components as those of the aforementioned first embodiment are denoted by the same reference numerals, and no detailed description is provided for them.

i) The sludge adhesion section 22A is arranged between the water sprinkling pipe 20 in the first tier and the water sprinkling pipe 21 in the second tier, and the sludge adhesion section 22B is arranged between the water sprinkling pipe 21 in the second tier and the water sprinkling pipe 25 in the third tier.

ii) The pump 18 and the suction pipe 41 are removed, and the three water sprinkling pipes 20, 21 and 25 are all connected to the pump 17.

In this second embodiment, the sludge adhesion sections 22A and 22B were made of a resin material, or a material that is not corroded by the waste water. The surface areas of the sludge adhesion sections 22A and 22B were increased to allow the adhesion of a large amount of microorganism. Then, the sludge adhesion sections 22A and 22B were formed into a net shape for the prevention of the occurrence of pressure loss during the upward passing of the exhaust gas.

To such sludge adhesion sections 22A and 22B, a large amount of aerobic microorganism 15 adheres with the assistance of calcium fluoride 14 in a floc form having an adhesion property. On the other hand, the granular calcium carbonate mineral 13 is sprinkled from the three water sprinkling pipes 20, 21 and 25. However, the mineral is heavy, and therefore, it falls on the second water tank lower section 8 without adhering to the sludge adhesion sections 22A and 22B. This granular calcium carbonate mineral 13 treats the fluorine in the waste water when it falls through the sludge adhesion sections 22A and 22B, thereby neutralizing the acid components.

The aerobic microorganism 15 adhering to the sludge adhesion sections 22A and 22B can treat the organic matter in the exhaust gas and the organic matter in the waste water. The calcium fluoride 14 adhering to the sludge adhesion sections 22A and 22B neutralizes the acid components in the exhaust gas, although the effect is little, and is able to neutralize the acid components in the waste water.

This second embodiment, which has an increased density of the aerobic microorganism 15 in the upper portion 7 with the provision of the sludge adhesion sections 22A and 22B, can therefore improve the capability of treating the organic matter in the waste water and the exhaust gas.

In this second embodiment, no sludge adhesion section is provided below the water sprinkling pipe 20 in the first tier, so that the exhaust gas can smoothly and uniformly rise upward through the current regulating plate 19.

Third Embodiment

Figure 5:
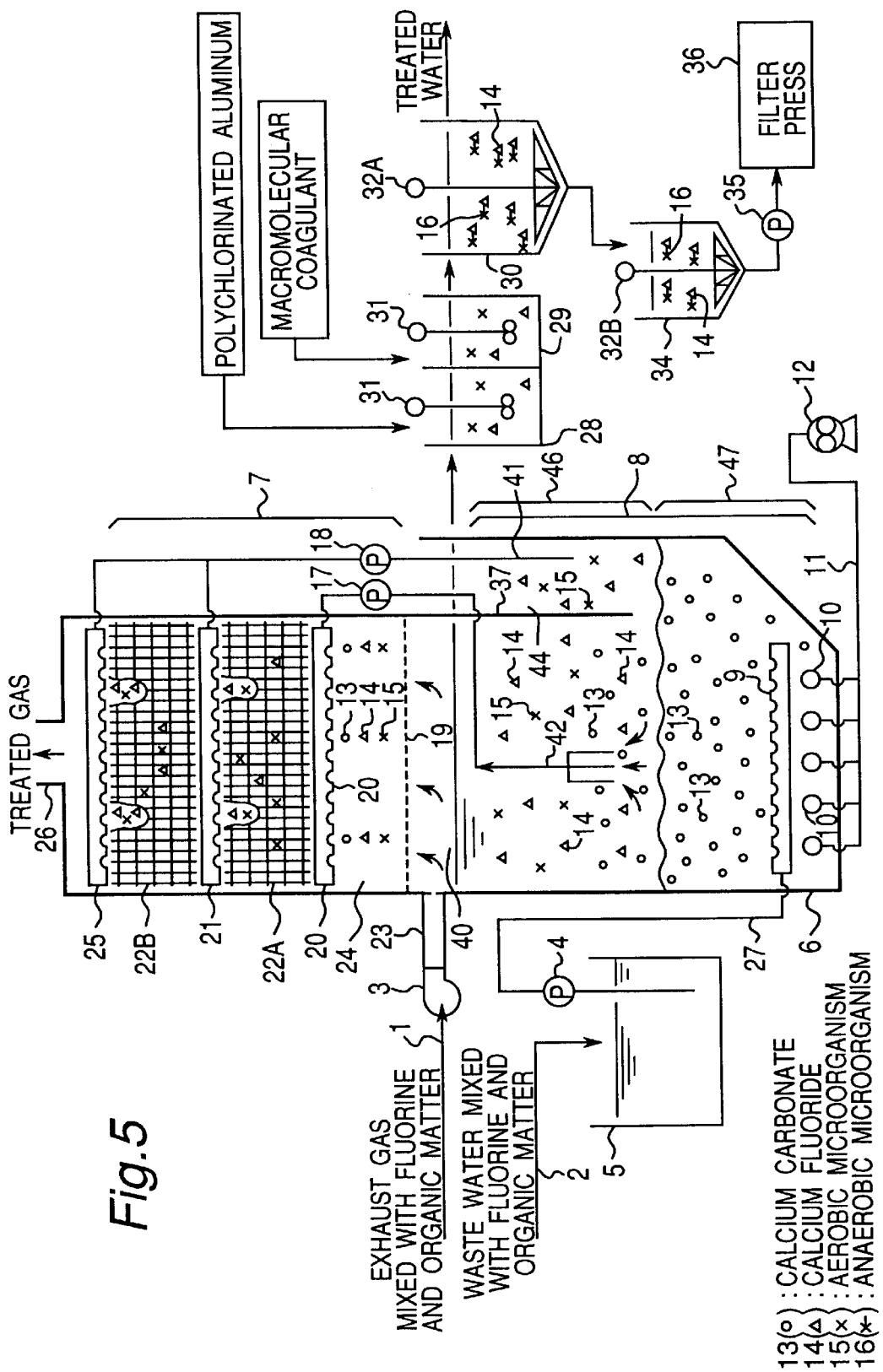
FIG. 5 is a view showing waste water treatment equipment according to a third embodiment of the present invention.

Next, FIG. 5 shows the third embodiment of the present invention. The waste water treatment equipment of the third embodiment differs from the second embodiment shown in FIG. 4 only in that the water sprinkling pipe 21 in the second tier and the water sprinkling pipe 25 in the third tier are connected to the suction pipe 41 arranged inside the separation chamber 44 by way of the pump 18. Therefore, the same components as those of the second embodiment shown in FIG. 4 are denoted by the same reference numerals, and no detailed description is provided for them.

In this third embodiment, the aerobic microorganism 15 and the calcium fluoride 14 in the floc form that are not precipitated in the separation chamber 44 are pumped up by the pump 18 and sprinkled from the water sprinkling pipe 21 in the second tier and the water sprinkling pipe 25 in the third tier and made to adhere to the sludge adhesion sections 22A and 22B constructed of a resin net. In this embodiment, the water sprinkling pipes 21 and 25 in the second tier and third tier sprinkles the waste water that does not include the calcium carbonate mineral 13 and includes the calcium fluoride 14 and the aerobic microorganism 15. With this arrangement, according to this third embodiment, the aerobic microorganism adheres to the net-shaped sludge adhesion sections 22A and 22B in higher density than in the second embodiment, so that the capability of treating the organic matter in the waste water and the exhaust gas improves. In the second embodiment, the calcium carbonate mineral 13 is sprinkled from the water spraying pipes in the second tier and the third tier, and this peels off the aerobic microorganism in the sludge adhesion section, leading to a reduced density of the aerobic microorganism as compared with the third embodiment.

Fourth Embodiment

Figure 6:
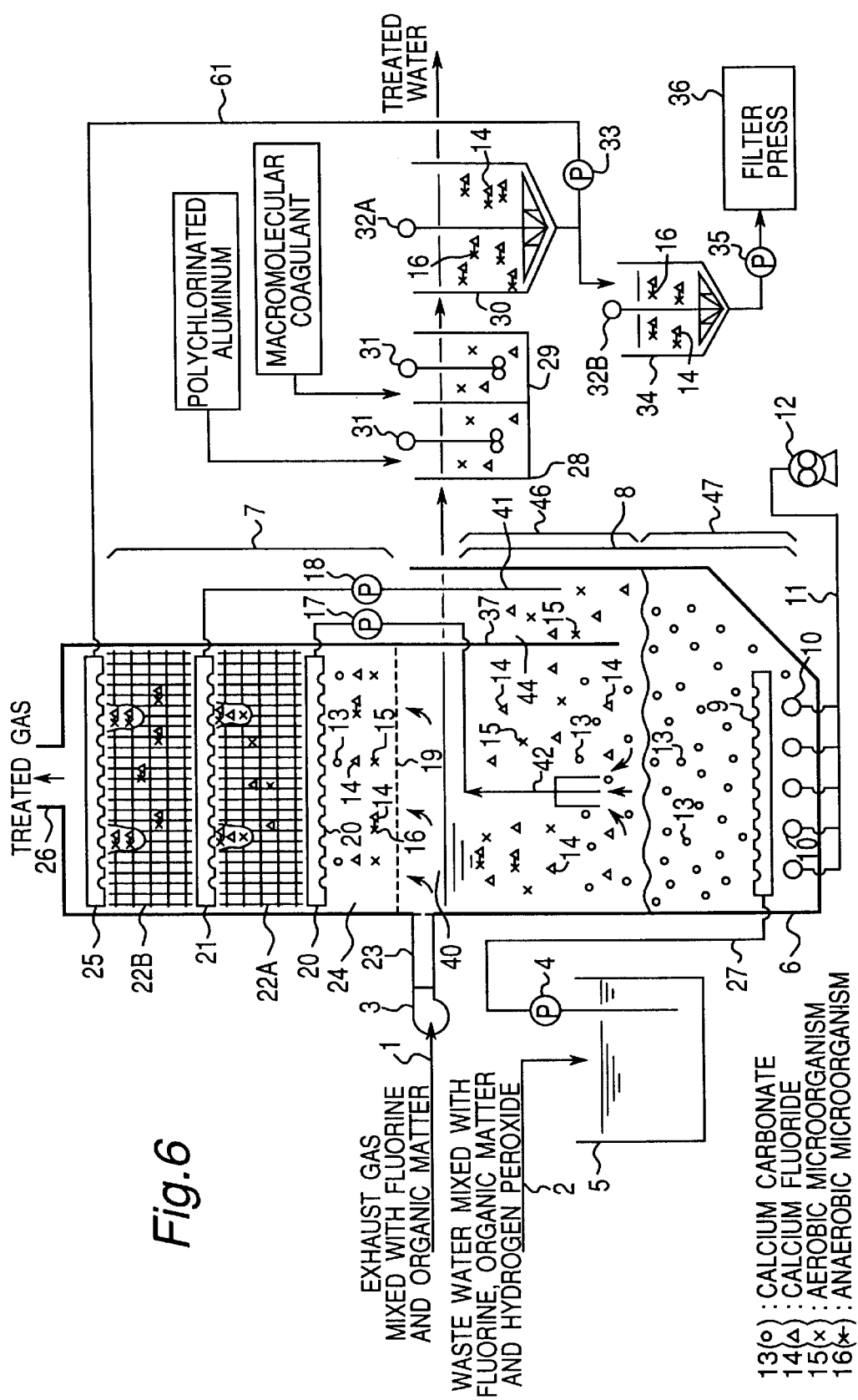
FIG. 6 is a view showing waste water treatment equipment according to a fourth embodiment of the present invention.

Next, FIG. 6 shows waste water treatment equipment of the fourth embodiment of the present invention. This fourth embodiment differs from the aforementioned third embodiment only in that the water sprinkling pipe 25 in the third tier of the third embodiment shown in FIG. 5 is not connected to the pump 18 but connected to a return pipe 61 at the bottom of the fifth water tank 30 via a pump 33.

In this fourth embodiment, the sludge precipitated at the bottom of the fifth water tank 30 that serves as a sedimentation tank is conveyed with pressure to the water sprinkling pipe 25 in the third tier by the sludge return pump 33, and the waste water including the sludge is sprinkled from this water sprinkling pipe 25. The sludge includes an anaerobic microorganism 16 and calcium fluoride 14, and the anaerobic microorganism 16 is concurrently wrapped and fixed by the calcium fluoride 14. Therefore, in the sludge adhesion section 22A below the water sprinkling pipe 25 in the third tier, the anaerobic microorganism 16 wrapped and fixed by the calcium fluoride 14 are retained in a state in which the microorganism is adhering and propagating in high density.

In this fourth embodiment, the anaerobic microorganism 16 that is adhering in high density to the net-shaped sludge adhesion section 22B below the water sprinkling pipe 25 in the third tier treats the fluorine in the exhaust gas by taking the fluorine into its body and treats the organic matter in the exhaust gas in a microorganic manner. Then, the exhaust gas treated by the anaerobic microorganism is discharged from the ventilation port 26.

On the other hand, the water sprinkling pipe 20 in the first tier sprinkles the waste water containing the granular calcium carbonate mineral 13, the calcium fluoride 14 and the aerobic microorganism 15, while the water sprinkling pipe 21 in the second tier sprinkles the waste water containing the calcium fluoride 14 and the aerobic microorganism 15. The anaerobic microorganism 16 falling from the water sprinkling pipe 25 in the third tier dies as a consequence of its being put in an aerobic state for one hour or more in the second water tank lower section 8, and the aerobic microorganism 15 is propagating inside the separation chamber 44.

In this fourth embodiment, hydrogen peroxide in the waste water is decomposed and treated by being brought in contact with the anaerobic microorganism having reducibility in the sludge adhesion section 22A.

Fifth Embodiment

Figure 7:
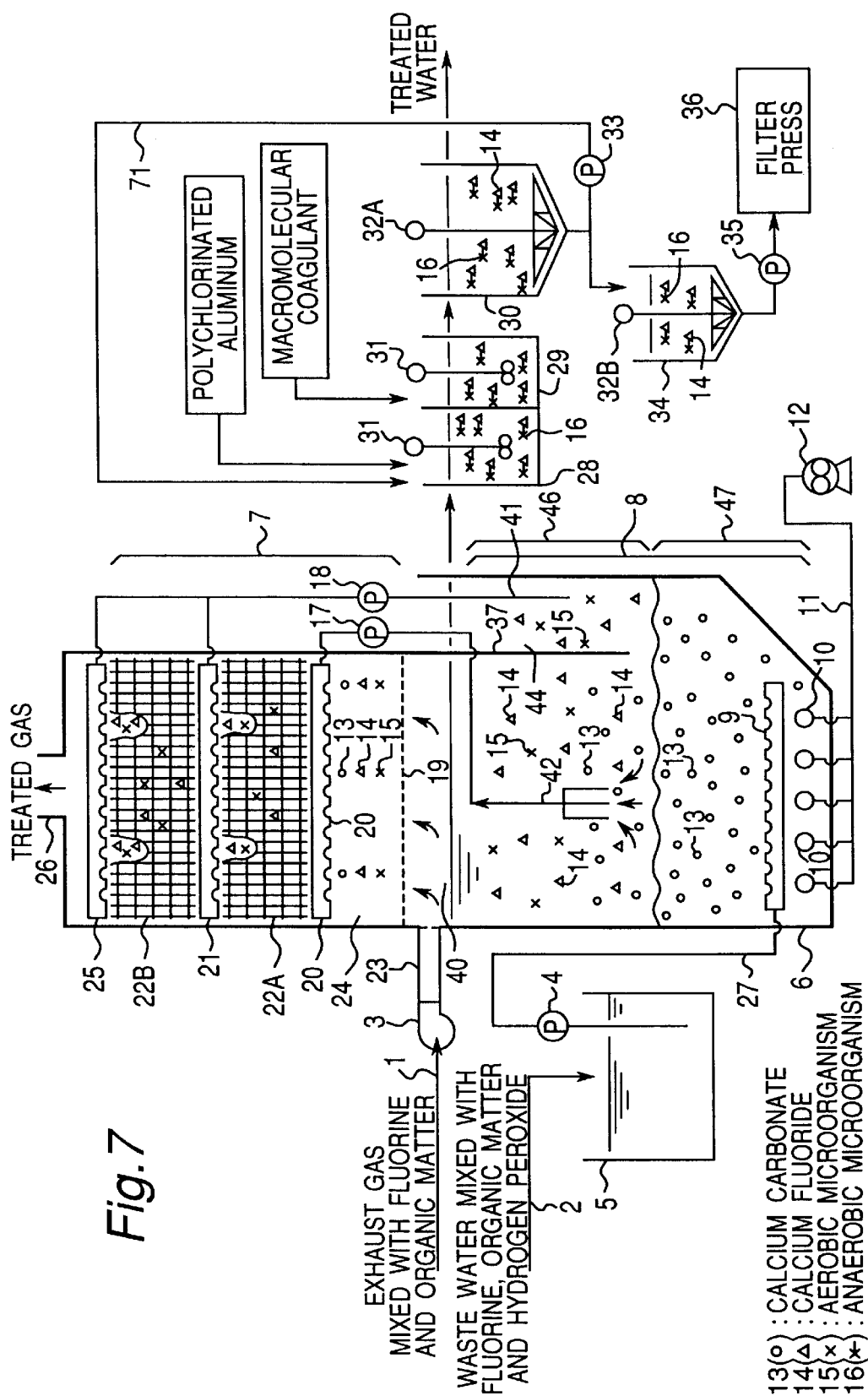
FIG. 7 is a view showing waste water treatment equipment according to a fifth embodiment of the present invention.

Next, FIG. 7 shows waste water treatment equipment of the fifth embodiment of the present invention. This fifth embodiment differs from the aforementioned fourth embodiment only in that the water sprinkling pipe 25 in the third tier is connected to the pump 18 and there is provided a pipe 71 that extends from the bottom of the fifth water tank 30 via the sludge return pump 33 to the third water tank 28.

The sludge precipitated at the bottom of the fifth water tank 30 includes the anaerobic microorganism 16 that is wrapped and fixed by calcium fluoride. This anaerobic microorganism 16, which has reducibility, can treat the oxidizing agent such as the hydrogen peroxide included in the waste water.

In this fifth embodiment, the anaerobic microorganism 16 that is wrapped and fixed by the calcium fluoride 14 and has a reducibility is returned from the sludge return pump 33 to the third water tank 28. By this operation, the anaerobic microorganism 16 having the reducibility can treat the hydrogen peroxide in the waste water while being protected by the calcium fluoride 14 from becoming extinct due to the hydrogen peroxide having a sterilizing property.

In this fifth embodiment, the anaerobic microorganism 16 is sent back to the non-aeration third water tank 28 instead of being sent back to the second water tank 6 in the aerated aerobic state as in the fourth embodiment, and therefore, the reducibility of the anaerobic microorganism 16 can be maintained. Therefore, according to this fifth embodiment, the hydrogen peroxide treatment capability can be improved as compared with the fourth embodiment.

Sixth Embodiment

Figure 8:
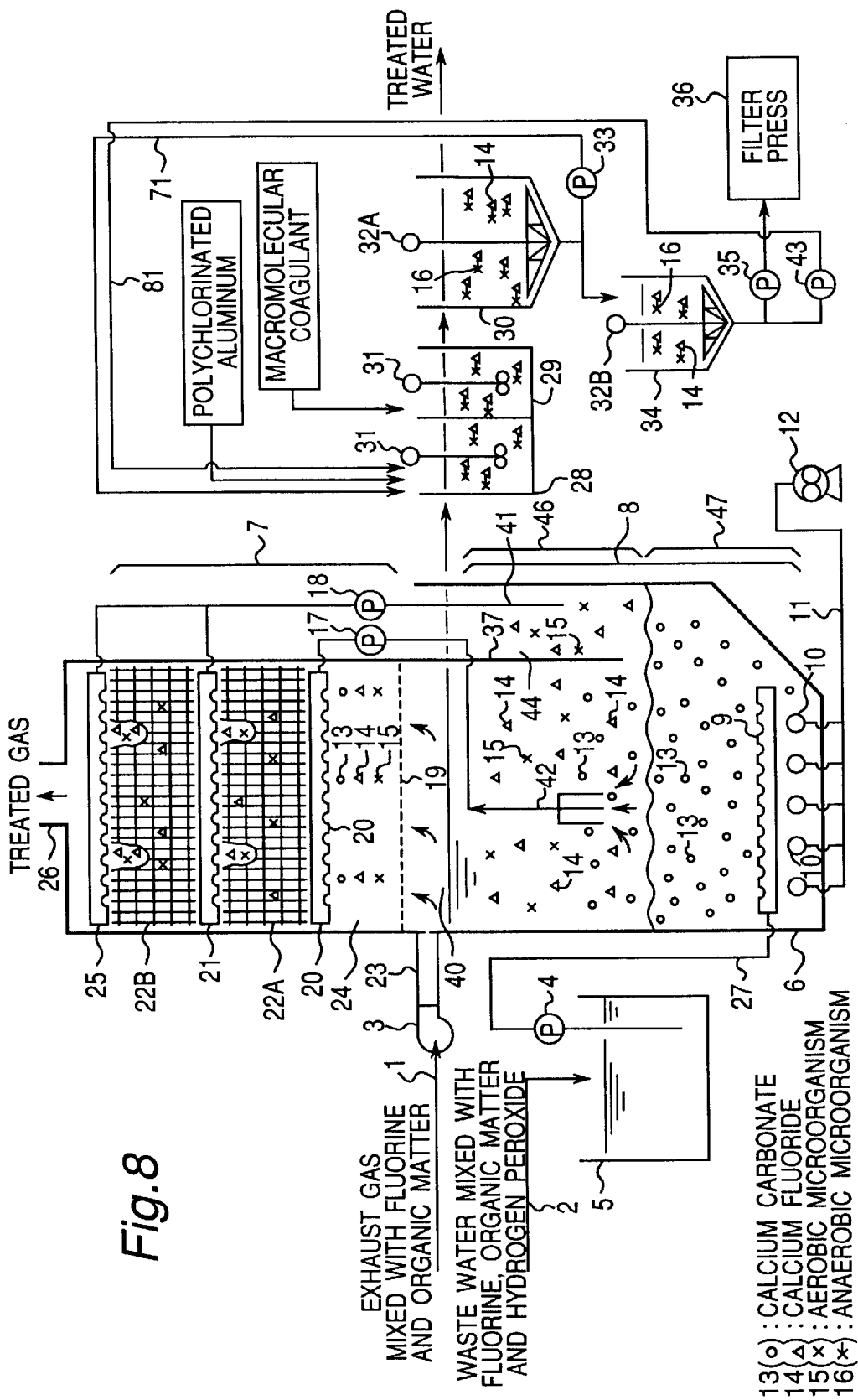
FIG. 8 is a view showing waste water treatment equipment according to a sixth embodiment of the present invention.

Next, FIG. 8 shows the sixth embodiment of the present invention. This sixth embodiment differs from the aforementioned fifth embodiment only in that a return pipe 81 extending to the third water tank 28 by way of a pump 43 connected by piping to the bottom of the sixth water tank 34 is provided.

At the bottom of the sixth water tank 34 is a condensed sludge in which the anaerobic microorganism 16 that is wrapped and fixed by the calcium fluoride 14 and has a reducibility is condensed in high density. This highly condensed sludge, which is condensed in high density, has a greater reducibility than in the precipitation sludge of the fifth water tank 30. In this sixth embodiment, the sludge that has a reducibility and is condensed in high density at the bottom of the sixth water tank 34 is sent back to the third water tank 28 by way of the return pipe 81. Therefore, the reducibility of the anaerobic microorganism 16 is maintained further than in the fifth embodiment, so that the hydrogen peroxide can be more effectively decomposed and treated.

Seventh Embodiment

Figure 9:
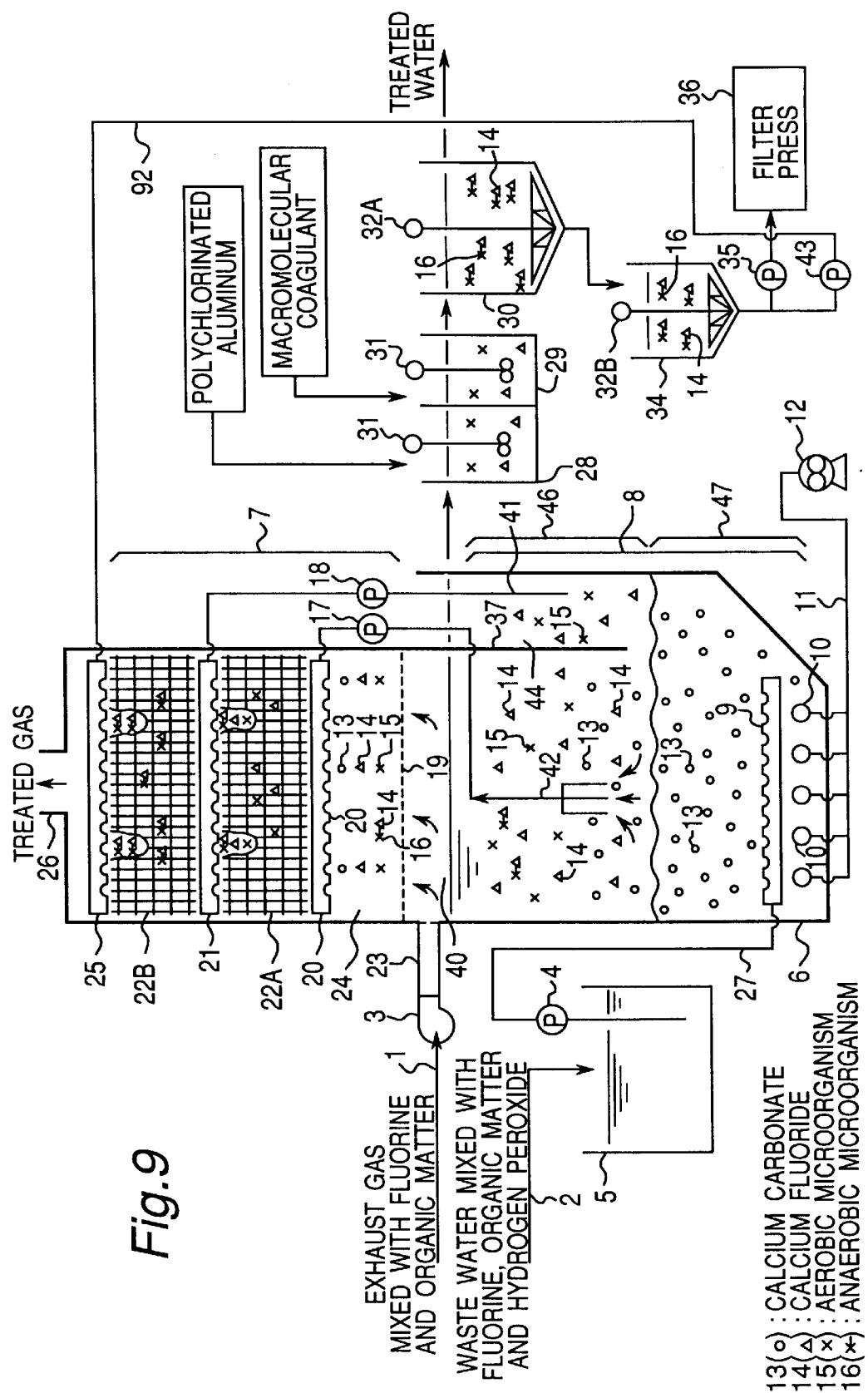
FIG. 9 is a view showing waste water treatment equipment according to a seventh embodiment of the present invention.

Next, FIG. 9 shows the seventh embodiment of the present invention. This seventh embodiment is based on the fourth embodiment shown in FIG. 6 and has a construction in which the return pipe 61 connected to the water sprinkling pipe 25 in the third tier is removed from the bottom of the fifth water tank 30 and a return pipe 92 is connected to the water sprinkling pipe 25 in the third tier of the second water tank upper section 7 by way of the pump 43 connected to the bottom of the sixth water tank 34.

This seventh embodiment is to sprinkle the condensed sludge from the bottom of the sixth water tank 34 downwardly of the sprinkling pipe 25 in the third tier of the second water tank 6 by the return pump 43. Therefore, the anaerobic microorganism 16 having a greater reducibility than in the fourth embodiment can be introduced in high density into the second water tank lower section 8. Therefore, according to this seventh embodiment, the hydrogen peroxide in the waste water can be treated more effectively than in the fourth embodiment.

Furthermore, according to this seventh embodiment, the highly condensed anaerobic microorganism 16 is sprinkled from the sprinkling pipe 25 in the third tier. Therefore, the microorganic sludge is adhered to the sludge adhesion section 22B in high density, so that the organic matter in the exhaust gas can be efficiently treated.

Eighth Embodiment

Figure 10:
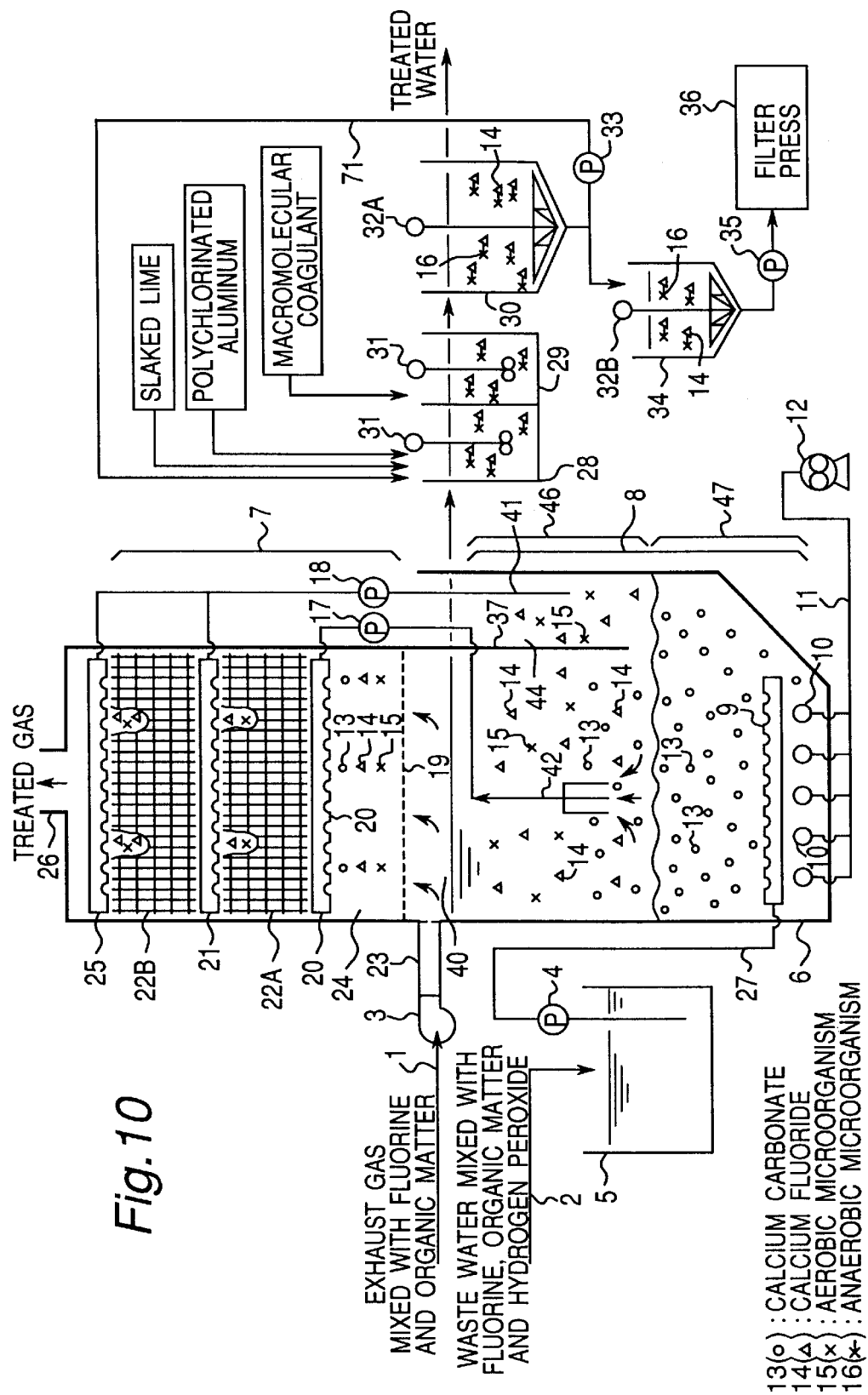
FIG. 10 is a view showing waste water treatment equipment according to an eighth embodiment of the present invention.

Next, FIG. 10 shows waste water treatment equipment of the eighth embodiment of the present invention. This eighth embodiment differs from the fifth embodiment shown in FIG. 7 only in that not only polychlorinated aluminum that serves as an aluminum agent and macromolecular coagulant but also slaked lime are added.

According to this eighth embodiment, the waste water introduced into the drain pipe 2 contains phosphorus in addition to the fluorine, hydrogen peroxide and organic matter. The reason why phosphorus is contained in the waste water is that phosphoric acid is used in the cleaning process in the semiconductor plant or liquid crystal plant.

In this eighth embodiment, the fluorine, hydrogen peroxide and organic matter are treated similar to the aforementioned fifth embodiment, while the phosphorus in the waste water becomes calcium phosphate with the addition of slaked lime in the third water tank 28 and precipitated in the fifth water tank 30. Further, since the slaked lime is added to the third water tank 28, not only the phosphorus in the waste water but also the fluorine can be highly treated.

The phosphorus in the waste water does not react with the calcium dissolved from the calcium carbonate mineral according to the result of operation with the actual equipment. Therefore, the phosphorus can scarcely be treated in the second water tank 6.

According to this eighth embodiment, although the slaked lime is put in the third water tank 28 in the aforementioned fifth embodiment, the phosphorus in the waste water can be treated by putting slaked lime in the third water tank 28 even in any one of the first through seventh embodiments.

Ninth Embodiment

Figure 11:
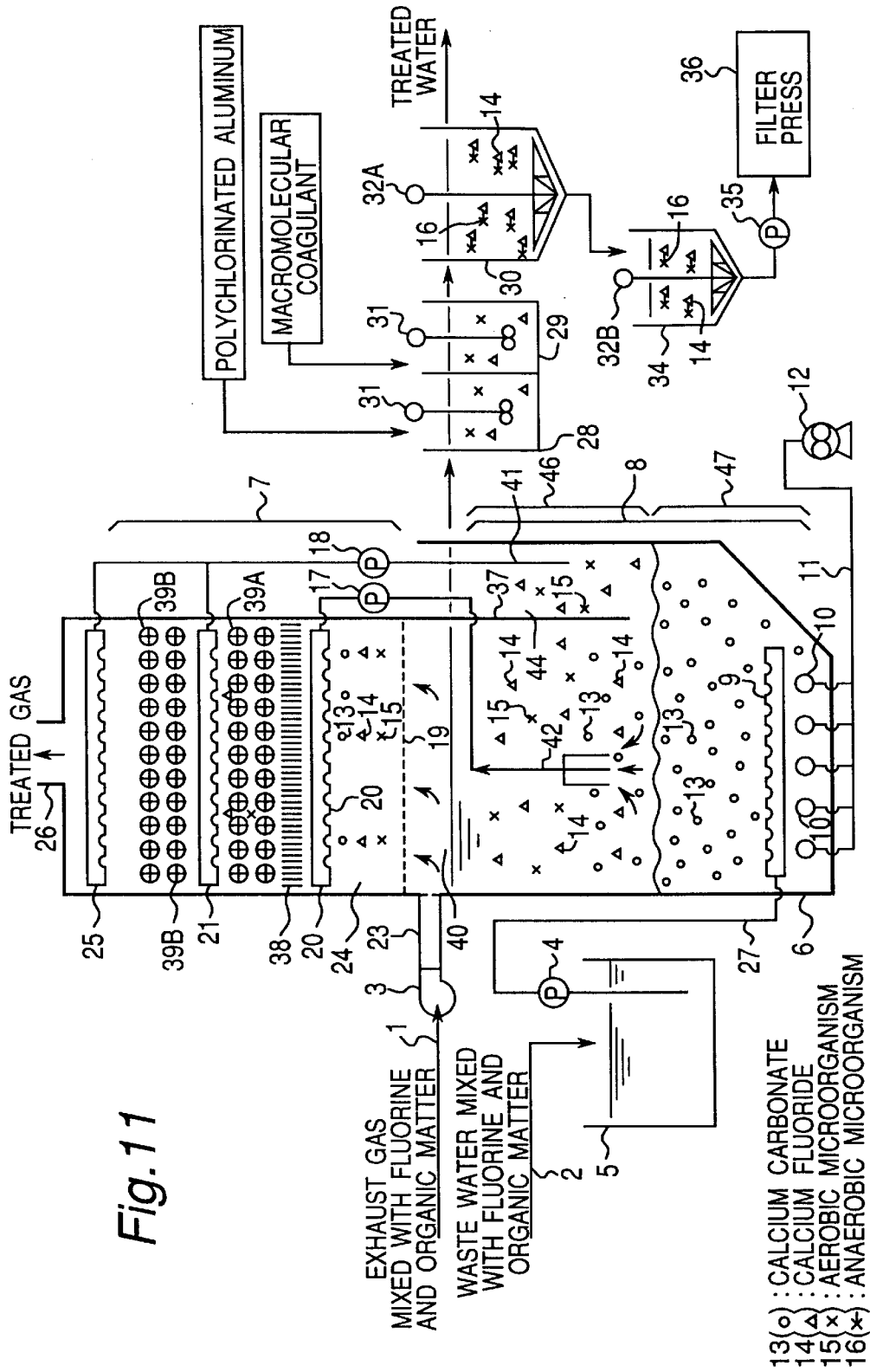
FIG. 11 is a view showing waste water treatment equipment according to a ninth embodiment of the present invention.

Next, FIG. 11 shows waste water treatment equipment of the ninth embodiment of the present invention. This ninth embodiment is provided with plastic fillers 39A and 39B in place of the sludge adhesion sections 22A and 22B made of a resin net in the waste water treatment equipment shown in FIG. 5.

For the plastic fillers 39A and 39B, it is proper to select, specifically, Raschig ring, Berl saddle, interlock saddle, Tellerette, pall ring or the like. These fillers are used for general exhaust gas treatment equipment and have relatively small air resistances.

The plastic fillers 39A and 39B have a thinner reticulation than those of the net-shaped sludge adhesion sections 22A and 22B, and therefore, the amount of adhesion of microorganism or the like increases.

Tenth Embodiment

Figure 12:
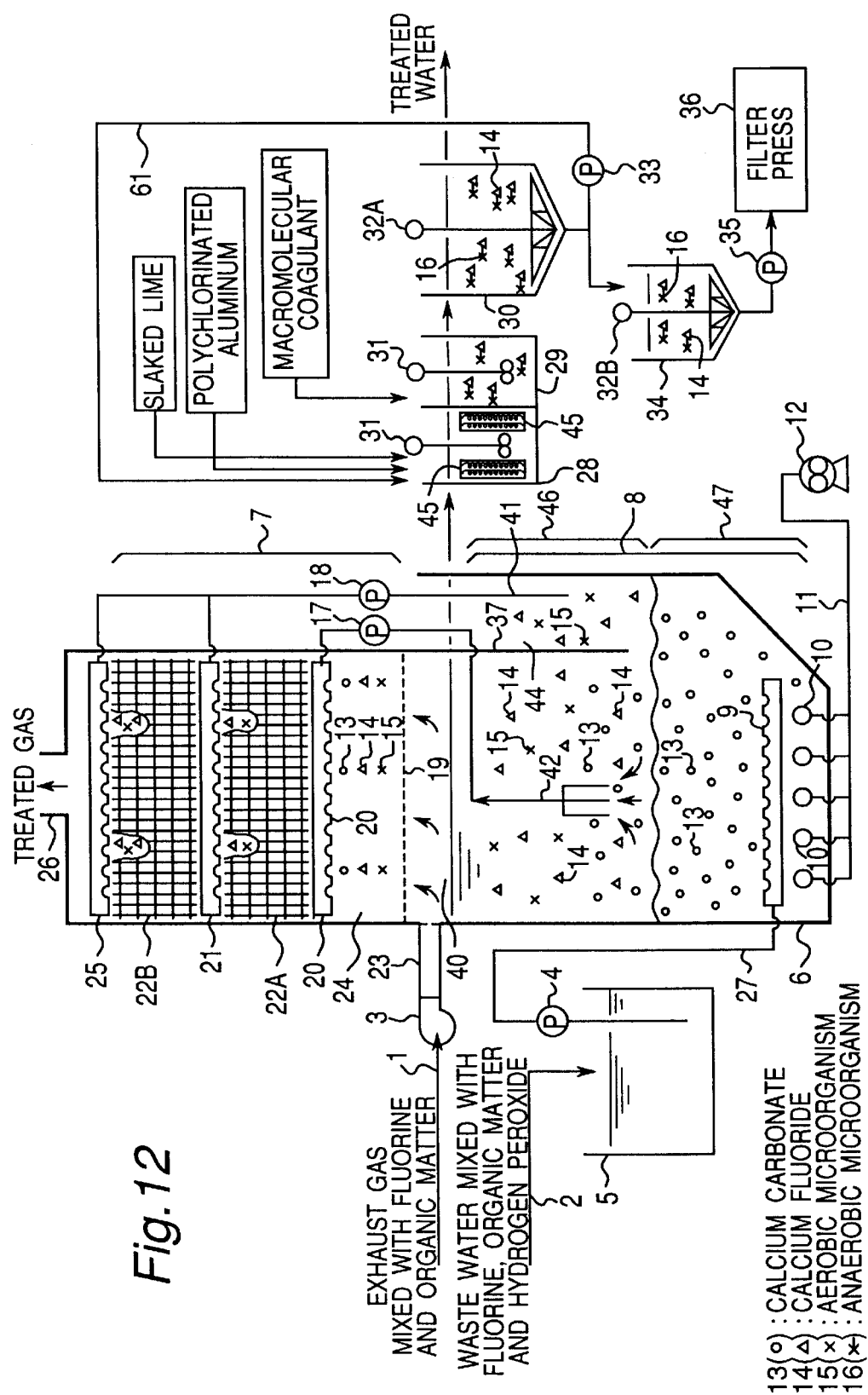
FIG. 12 is a view showing waste water treatment equipment according to a tenth embodiment of the present invention.

Next, FIG. 12 shows waste water treatment equipment of the tenth embodiment of the present invention. This tenth embodiment is based on the waste water treatment equipment of the eighth embodiment shown in FIG. 10 and has a construction in which a sludge fixing section 45 is arranged inside the third water tank 28. This sludge fixing section 45 includes the fixing material of, for example, vinylidene chloride as a constituent element.

In this tenth embodiment, the anaerobic microorganism 16 wrapped and fixed by the calcium fluoride 14 is maintained in high density in the sludge fixing section 45. Therefore, according to this tenth embodiment, as compared with the eighth embodiment shown in FIG. 10, the anaerobic microorganism having a reducibility can be maintained in high density in the third water tank 28, thereby allowing the hydrogen peroxide in the waste water to be more effectively treated.

First Experimental Example

Next, a waste water treatment experimental example using experimental equipment having the same structure as that of the first embodiment shown in FIG. 1 will be described as a concrete experimental example. In this experimental example, the capacity of the first water tank 5 was set to about 150 cubic meters, the capacity of the second water tank lower section 8 was set to about 300 cubic meters and a second water tank upper section 7 was mounted as an experimental unit on this large-size second water tank lower section 8 although the section 7 has a small size. The capacity of this second water tank upper section 7 was set to about seven cubic meters. The capacity of the third water tank (reaction tank) 28 was set to 225 cubic meters, and the capacity of the fourth water tank (coagulation tank) 29 was set to 255 cubic meters. The capacity of the fifth water tank (sedimentation tank) 30 was set to 900 cubic meters.

An organic matter containing waste water having a pH 2.2, a fluorine concentration of 152 ppm and a COD of 12 ppm was treated by this experimental equipment, and consequently the treated waste water came to have a pH 7.5, a fluorine concentration of 4.1 ppm and a COD of 7.2 ppm.

When the HF gas concentration contained in the exhaust gas was 2 mg/NM$^3$ (normal cubic meters) in the fan ventilation duct 23 at the entrance of the exhaust gas into the second water tank upper section 7, the HF gas concentration at the exit of the exhaust gas in the uppermost portion of the second water tank upper section 7 was able to be reduced to 0.65 mg/NM$^3$ (normal cubic meters) or less. That is, the HF gas concentration could be reduced to one third or less. Further, when acetone as a representative of organic matter in the exhaust gas was measured, the acetone concentration in the ventilation port 26 at the exit of the exhaust gas in the uppermost portion of the second water tank upper section 7 was not greater than 0.5 mg/NM$^3$ when the acetone concentration in the fan ventilation duct 23 at the entrance of the exhaust gas into the second water tank upper section 7 was 1 mg/NM$^3$. That is, the acetone density could be reduced to one half or less.

Second Experimental Example

A second experimental example will be described next. This second experimental example was performed by means of experimental equipment having the same structure as that of the waste water treatment equipment of the seventh embodiment shown in FIG. 9. According to this second experimental example, the capacity of the first water tank 5 was set to about 150 cubic meters, the capacity of the second water tank lower section 8 was set to about 300 cubic meters and a second water tank upper section 7 was mounted as an experimental unit on this large-size second water tank lower section 8 although the section 7 has a small size. The capacity of this second water tank upper section 7 was set to about seven cubic meters. The capacity of the third water tank (coagulation tank) 28 was set to 255 cubic meters, and the capacity of the fourth water tank (coagulation tank) 29 was set to 225 cubic meters. The capacity of the fifth water tank (sedimentation tank) 30 was set to 900 cubic meters.

As a result of performing waste water treatment by this equipment, an organic matter containing waste water having a pH 2.1, a fluorine concentration of 150 ppm, a COD of 13 ppm and a hydrogen peroxide concentration of 82 ppm prior to the treatment was able to be a treated water having a pH 7.4, a fluorine concentration of 4.7 ppm, a COD of 5.2 ppm and a hydrogen peroxide concentration of 1 ppm.

When the HF gas concentration of the exhaust gas was 2 mg/NM$^3$ (normal cubic meters) in the fan ventilation duct 23 at the entrance of the exhaust gas into the second water tank upper section 7, the HF gas concentration in the ventilation port 26 at the exit of the exhaust gas in the uppermost portion of the second water tank upper section 7 was able to be reduced to 0.46 mg/NM$^3$ or less. That is, the HF gas density could be reduced to one fourth or less.

Further, as a result of measurement of acetone as a representative of organic matter in the exhaust gas, the acetone concentration in the ventilation port 26 at the exit of the exhaust gas in the uppermost portion of the second water tank upper section 7 was not greater than 0.2 mg/NM³ when the acetone concentration in the fan ventilation duct 23 at the entrance of the exhaust gas into the second water tank upper section 7 was 1 mg/NM³. That is, the acetone density could be reduced to one fifth or less.

As described above, according to the concrete experimental examples, the waste water treatment equipment of the seventh embodiment shown in FIG. 9 is superior in terms of, in particular, the extraction ratios of COD, HF gas, acetone and hydrogen peroxide due to the existence of the sludge adhesion sections 22A and 22B and the sludge return from the bottom of the sixth water tank to the waste water treatment equipment of the first embodiment shown in FIG. 1.

As described above, according to the present invention, the waste water and the granular calcium carbonate mineral are made to react with each other while putting the granular calcium carbonate mineral in the weak flowing state by the aerating means. Therefore, the fluorine concentration in the waste water can be reduced without solidifying the calcium carbonate mineral. Conventionally, the calcium carbonate mineral that has not been easily made to flow by the aeration has generated a solid mass over a long-time operation (more than two months of operation), and the extraction ratio of the fluorine concentration in the waste water has been reduced. In contrast to this, according to the present invention, the fluorine can be stably removed even through a long-time operation.

Figure 13:
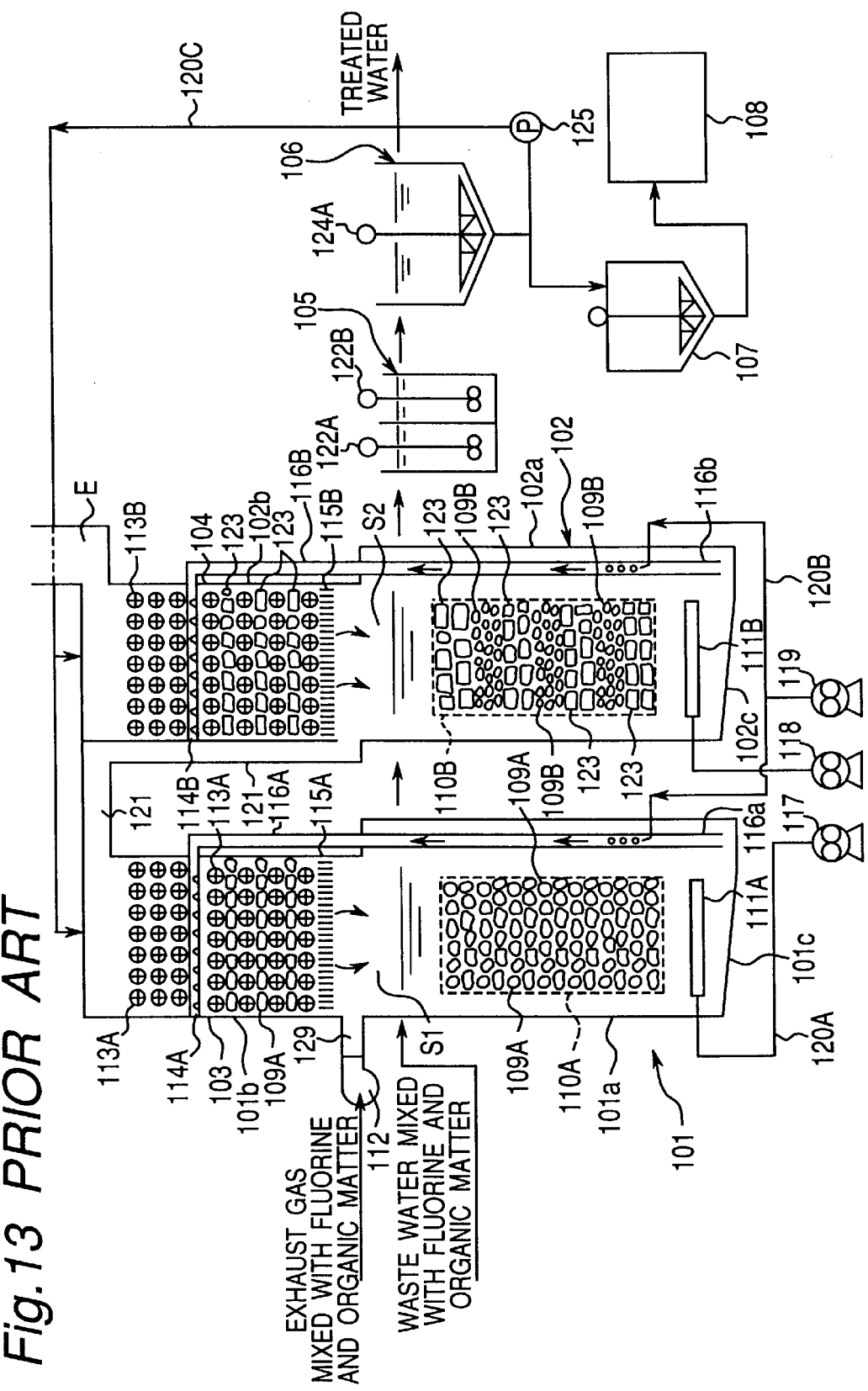
FIG. 13 is a view showing prior art waste water treatment equipment.

Furthermore, by virtue of the chemical treatment in the lower portion of the water tank lower section and the microorganism generated in the upper portion of the water tank lower section, the fluorine in the waste water (fluorine treatment by microorganic condensation) and the organic matter such as the surfactant and the organic solvent in the waste water can be concurrently biologically treated in the identical water tank. That is, as shown in FIG. 13, the two water tanks of the prior art example, in which the fluorine has been treated in the first tank and the organic matter has been treated in the second tank, can be reasonably integrated into one tank.

The unreacted granular calcium carbonate mineral in the upper portion of the water tank lower section, the calcium fluoride after the reaction and the generated microorganism are pumped up to the water tank upper section and sprinkled from the water sprinkling pipe in the water tank upper section. Therefore, the fluorine and the organic matter in the introduced exhaust gas can be concurrently treated chemically and biologically in the one tank.

The granular calcium carbonate mineral having a good reactivity is used for the treatment instead of the use of the large calcium carbonate mineral pieces as observed in the prior art example. Therefore, the equipment can be totally compacted. Then, the fact that the calcium carbonate mineral has a granular form also has the advantages that the running cost is inexpensive, pneumatic transportation is enabled and the tank can be easily internally replenished with the mineral.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waste water treatment method comprising the steps of:

flowing a granular calcium carbonate mineral, calcium fluoride in a floc form and a microorganism in a waste water introduced into a lower section, wherein the waste water contains fluorine and organic matter;

sprinkling the waste water including the granular calcium carbonate mineral, the calcium fluoride in the floc form and the microorganism over the exhaust gas introduced into an upper section, wherein the exhaust gas contains fluorine and organic matter; and circulating the waste water from the upper section to the lower section and from the lower section to the upper section.

2. A waste water treatment method comprising the steps of:

flowing a granular calcium carbonate mineral in a waste water introduced into a lower section, wherein the waste water contains fluorine and organic matter;

sprinkling the waste water including the granular calcium carbonate mineral over an exhaust gas introduced into an upper section, wherein the exhaust gas contains fluorine and organic matter; and circulating the waste water from the upper section to the lower section and from the lower section to the upper section, wherein the granular calcium carbonate mineral has a particle diameter of 0.1 millimeter to 2.0 millimeters and the upper section does not have plastic fillers and charcoals for propagation of microorganisms.

3. A waste water treatment method as claimed in claim 1, wherein the granular calcium carbonate mineral has a particle diameter of 0.1 millimeter to 2.0 millimeters and the upper section does not have plastic fillers and charcoals for propagation of microorganisms.

4. A waste water treatment method comprising the steps of:

flowing a granular calcium carbonate mineral in a waste water introduced into a lower section, wherein the waste water contains fluorine and organic matter;

sprinkling the waste water including calcium fluoride in a floc form and a microorganism generated in the lower section over an upper section in which a sludge adhesion medium is arranged and an exhaust gas is introduced, wherein the exhaust gas contains fluorine and organic matter; and circulating the waste water from the upper section to the lower section and from the lower section to the upper section.

5. A waste water treatment method as claimed in claim 4, wherein the sludge adhesion medium is made of a resin and made to have a relatively large surface area and the granular calcium carbonate mineral has a particle diameter of 0.1 millimeter to 2.0 millimeters and the upper section does not have plastic fillers and charcoals for propagation of microorganisms.

6. Waste water treatment equipment comprising:

a water tank lower section in which a waste water is introduced from below and a granular calcium carbonate mineral is made to flow in the waste water by a stirring means for stirring the waste water, wherein the waste water contains fluorine and organic matter;

a water tank upper section which is arranged above a water level of the waste water in the water tank lower section and in which an exhaust gas is introduced and a sludge adhesion section constructed so as to have a water flowability is provided, wherein the exhaust gas contains fluorine and organic matter;

a waste water circulating means for pumping up the waste water from above the water tank lower section into the water tank upper section and sprinkling the pumped-up waste water on the water tank upper section; and an exhaust gas introducing means for introducing an exhaust gas into a space section between the water tank lower section and the water tank upper section.

7. Waste water treatment equipment comprising:

a water tank lower section which has a granular calcium carbonate mineral that is stowed so as to flow in an introduced waste water, a stirring means for stirring the waste water and a non-stirring region that is not stirred by this stirring means, wherein the waste water contains fluorine and organic matter;

a water tank upper section which is arranged above the water tank lower section and a water level of the waste water introduced into the water tank lower section and which has a sludge adhesion section having an adhesion medium that is constructed so as to have a water flowability;

a first waste water circulating means for pumping up the waste water containing calcium fluoride in a floc form and a microorganism from the non-stirring region of the water tank lower section and sprinkling the waste water on the sludge adhesion section of the water tank upper section;

a second waste water circulating means for pumping up the waste water containing the calcium carbonate mineral, the calcium fluoride in the floc form and the microorganism from a stirring region of the water tank lower section and sprinkling the waste water on a portion that belongs to the water tank upper section and is other than the sludge adhesion section; and an exhaust gas introducing means for introducing an exhaust gas into a space between the lower section and the upper section, wherein the exhaust gas contains fluorine and organic matter.

8. Waste water treatment equipment as claimed in claim 6, wherein the stirring means performs stirring by aeration.

9. Waste water treatment equipment as claimed in claim 7, wherein the stirring means performs stirring by aeration.

10. Waste water treatment equipment comprising:

a first water tank and a second water tank, the first water tank in which a waste water is introduced and reserved, the first water tank having a waste water introducing means for introducing a reserved waste water into the second water tank, wherein the waste water contains fluorine and organic matter, the second water tank being the waste water treatment equipment claimed in claim 6;

a third water tank in which the waste water from the second water tank is introduced, the third water tank having a stirring means for stirring the introduced waste water and receiving an aluminum agent put therein;

a fourth water tank in which a macromolecular coagulant is put;

a fifth water tank in which the waste water from the fourth water tank is introduced, the fifth water tank performing solid-liquid separation of the waste water and discharging separated supernatant liquid;

a sixth water tank in which the sludge formed through precipitation in the fifth water tank is introduced, the sixth water tank condensing the sludge through sedimentation;

a dehydrating means for dehydrating the sludge that is condensed in the sixth water tank and introduced into the dehydrating means; and a sludge returning means for returning the sludge precipitated in the fifth water tank or the sludge condensed in the sixth water tank to at least one second water tank and the third water tank.

11. Waste water treatment equipment comprising:

a first water tank and a second water tank, the first water tank in which a waste water is introduced and reserved, the first water tank having a waste water introducing means for introducing a reserved waste water into the second water tank, wherein the waste water contains fluorine and organic matter, the second water tank being the waste water treatment equipment claimed in claim 7;

a third water tank in which the waste water from the second water tank is introduced, the third water tank having a stirring means for stirring the introduced waste water and receiving an aluminum agent put therein;

a fourth water tank in which a macromolecular coagulant is put;

a fifth water tank in which the waste water from the fourth water tank is introduced, the fifth water tank performing solid-liquid separation of the waste water and discharging separated supernatant liquid;

a sixth water tank in which the sludge formed through precipitation in the fifth water tank is introduced, the sixth water tank condensing the sludge through sedimentation;

a dehydrating means for dehydrating the sludge that is condensed in the sixth water tank and introduced into the dehydrating means; and a sludge returning means for returning the sludge precipitated in the fifth water tank or the sludge condensed in the sixth water tank to at least one of the second water tank and the third water tank.

12. Waste water treatment equipment as claimed in claim 6, wherein the granular calcium carbonate mineral has a particle diameter of 0.1 millimeter to 2.0 millimeters and the upper section does not have plastic fillers and charcoals for propagation of microorganisms.

13. Waste water treatment equipment as claimed in claim 7, wherein the granular calcium carbonate mineral has a particle diameter of 0.1 millimeter to 2.0 millimeters and the upper section does not have plastic fillers and charcoals for propagation of microorganisms.

14. Waste water treatment equipment as claimed in claim 7, wherein the sludge to be introduced into the sludge adhesion section is sludge including anaerobic microorganic sludge.

15. Waste water treatment equipment as claimed in claim 10, wherein
the sludge to be introduced into the sludge adhesion section is sludge including anaerobic microorganic sludge.

16. Waste water treatment equipment as claimed in claim 10, wherein
the third water tank includes a sludge fixing means for fixing the sludge in the introduced waste water.

17. Waste water treatment equipment as claimed in claim 10, wherein
slaked lime is put into the third water tank.

18. Waste water treatment equipment as claimed in claim 10, wherein
the aluminum agent put in the third water tank is polychlorinated aluminum.

19. Waste water treatment equipment comprising:
a water tank lower section in which a waste water is introduced from below and a granular calcium carbonate mineral is made to flow in the waste water by a stirrer for stirring the waste water, wherein the waste water contains fluorine and organic matter;
a water tank upper section which is arranged above a water level of the waste water in the water tank lower section and in which an exhaust gas is introduced and a sludge adhesion section constructed so as to have a water flowability is provided, wherein the exhaust gas contains fluorine and organic matter;
a waste water circulator for pumping up the waste water from above the water tank lower section into the water tank upper section and sprinkling the pumped-up waste water on the water tank upper section; and
an exhaust gas introducer for introducing an exhaust gas into a space section between the water tank lower section and the water tank upper section.

20. Waste water treatment equipment comprising:
a water tank lower section which has a granular calcium carbonate mineral that is stowed so as to flow in an introduced waste water, a stirrer for stirring the waste water and a non-stirring region that is not stirred by this stirrer, wherein the waste water contains fluorine and organic matter;
a water tank upper section which is arranged above the water tank lower section and a water level of the waste water introduced into the water tank lower section and which has a sludge adhesion section having an adhesion medium that is constructed so as to have a water flowability;
a first waste water circulator for pumping up the waste water containing calcium fluoride in a floc form and a microorganism from the non-stirring region of the water tank lower section and sprinkling the waste water on the sludge adhesion section of the water tank upper section;
a second waste water circulator for pumping up the waste water containing the calcium carbonate mineral, the calcium fluoride in the floc form and the microorganism from a stirring region of the water tank lower section and sprinkling the waste water on a portion that belongs to the water tank upper section and is other than the sludge adhesion section; and
an exhaust gas introducer for introducing an exhaust gas into a space between the lower section and the upper section, wherein the exhaust gas contains fluorine and organic matter.

21. Waste water treatment equipment as in claim 19, wherein
the stirrer performs stirring by aeration.

22. Waste water treatment equipment as in claim 20, wherein the stirrer performs stirring by aeration.

23. Waste water treatment equipment comprising:
a first water tank and a second water tank,
the first water tank in which a waste water is introduced and reserved, the first water tank having a waste water introducer for introducing a reserved waste water into the second water tank, wherein the waste water contains fluorine and organic matter,
the second water tank being the waste water treatment equipment claimed in claim 11;
a third water tank in which the waste water from the second water tank is introduced, the third water tank having a stirrer for stirring the introduced waste water and receiving an aluminum agent put therein;
a fourth water tank in which a macromolecular coagulant is put;
a fifth water tank in which the waste water from the fourth water tank is introduced, the fifth water tank performing solid-liquid separation of the waste water and discharging separated supernatant liquid;
a sixth water tank in which the sludge formed through precipitation in the fifth water tank is introduced, the sixth water tank condensing the sludge through sedimentation;
a dehydrator for dehydrating the sludge that is condensed in the sixth water tank and introduced into the dehydrator; and
a sludge returner for returning the sludge precipitated in the fifth water tank or the sludge condensed in the sixth water tank to at least one second water tank and the third water tank.

24. Waste water treatment equipment comprising:
a first water tank and a second water tank,
the first water tank in which a waste water is introduced and reserved, the first water tank having a waste water introducer for introducing a reserved waste water into the second water tank, wherein the waste water contains fluorine and organic matter,
the second water tank being the waste water treatment equipment claimed in claim 20;
a third water tank in which the waste water from the second water tank is introduced, the third water tank having a stirrer for stirring the introduced waste water and receiving an aluminum agent put therein;
a fourth water tank in which a macromolecular coagulant is put;
a fifth water tank in which the waste water from the fourth water tank is introduced, the fifth water tank performing solid-liquid separation of the waste water and discharging separated supernatant liquid;
a sixth water tank in which the sludge formed through precipitation in the fifth water tank is introduced, the sixth water tank condensing the sludge through sedimentation;
a dehydrator for dehydrating the sludge that is condensed in the sixth water tank and introduced into the dehydrator; and
a sludge returner for returning the sludge precipitated in the fifth water tank or the sludge condensed in the sixth water tank to at least one of the second water tank and the third water tank.

25. Waste water treatment equipment as claimed in claim 19, wherein the granular calcium carbonate mineral has a particle diameter of 0.1 millimeter to 2.0 millimeters and the upper section does not have plastic fillers and charcoals for propagation of microorganisms.

26. Waste water treatment equipment as claimed in claim 20, wherein the granular calcium carbonate mineral has a particle diameter of 0.1 millimeter to 2.0 millimeters and the upper section does not have plastic fillers and charcoals for propagation of microorganisms.

27. Waste water treatment equipment as claimed in claim 20, wherein the sludge to be introduced into the sludge adhesion section is sludge including anaerobic microorganic sludge.

28. Waste water treatment equipment as claimed in claim 23, wherein the sludge to be introduced into the sludge adhesion section is sludge including anaerobic microorganic sludge.

29. Waste water treatment equipment as claimed in claim 23, wherein the third water tank includes a sludge fixer for fixing the sludge in the introduced water.

30. Waste water treatment equipment as claimed in claim 23, wherein slaked lime is put into the third water tank.

31. Waste water treatment equipment as claimed in claim 23, wherein the aluminum agent put into the third water tank is polychlorinated aluminum.

\* \* \* \* \*